*(12)* United States Patent
Katsuragi

(10) Patent No.: US 11,061,639 B2
(45) Date of Patent: *Jul. 13, 2021

(54) ELECTRONIC WHITEBOARD SYSTEM, ELECTRONIC WHITEBOARD, AND METHOD OF DISPLAYING CONTENT DATA

(71) Applicant: Ricoh Company, Ltd., Tokyo (JP)

(72) Inventor: Shiho Katsuragi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 257 days.

This patent is subject to a terminal disclaimer.

(21) Appl. No.: 16/198,938

(22) Filed: Nov. 23, 2018

(65) Prior Publication Data

US 2019/0286405 A1   Sep. 19, 2019

(30) Foreign Application Priority Data

Mar. 14, 2018   (JP) .............................. JP2018-047361

(51) Int. Cl.
| | |
|---|---|
| *G06F 3/14* | (2006.01) |
| *G06F 21/31* | (2013.01) |
| *G06Q 10/10* | (2012.01) |
| *G06Q 10/02* | (2012.01) |
| *G06F 3/0354* | (2013.01) |

(52) U.S. Cl.
CPC ............ *G06F 3/1454* (2013.01); *G06F 21/31* (2013.01); *G06Q 10/02* (2013.01); *G06Q 10/1095* (2013.01); *G06F 3/03545* (2013.01)

(58) Field of Classification Search
CPC ....... G06F 3/1454; G06F 21/31; G06Q 10/02; G06Q 10/1095
See application file for complete search history.

(56) References Cited

U.S. PATENT DOCUMENTS

| | | | | |
|---|---|---|---|---|
| 7,043,529 B1* | 5/2006 | Simonoff | ................ | H04L 67/02 |
| | | | | 709/204 |
| 9,690,538 B1* | 6/2017 | Doyle, III | .............. | G09G 5/391 |
| 10,126,927 B1* | 11/2018 | Fieldman | ................ | G06F 3/147 |
| 2004/0165768 A1* | 8/2004 | Zhang | ............... | H04L 29/06027 |
| | | | | 382/162 |

(Continued)

FOREIGN PATENT DOCUMENTS

JP   2001-292266   10/2001

*Primary Examiner* — Tongoc Tran
(74) *Attorney, Agent, or Firm* — Xsensus LLP

(57) ABSTRACT

An electronic whiteboard system includes at least one information processing system and at least one electronic whiteboard communicably connected to the information processing system. The information processing system stores, in a memory, one or more content management information records in each of which content data, user information, and information on a period of time are associated with each other. The electronic whiteboard reads, from a terminal of a user, ID corresponding to user information identifying the user, transmits, to the information processing system, the ID and information on a time at which the ID is read, receives, from the information processing system, content data included in a content management information record that includes a period of time within which the time at which the ID is read is included and user information identical to the user information corresponding to the ID, and displays the content data.

10 Claims, 27 Drawing Sheets

(56) References Cited

U.S. PATENT DOCUMENTS

| | | | |
|---|---|---|---|
| 2005/0104864 A1* | 5/2005 | Zhang | G06T 7/20 345/173 |
| 2013/0047093 A1* | 2/2013 | Reuschel | G06F 3/04883 715/753 |
| 2014/0055400 A1* | 2/2014 | Reuschel | G06F 3/011 345/173 |
| 2015/0332037 A1* | 11/2015 | Tse | G06K 9/00288 726/19 |
| 2016/0267287 A1* | 9/2016 | Kobayashi | G06F 21/83 |
| 2017/0220313 A1* | 8/2017 | Tsubone | H04N 7/147 |
| 2017/0357915 A1* | 12/2017 | Holmes | G06F 3/04883 |
| 2018/0069857 A1 | 3/2018 | Katsuragi et al. | |
| 2018/0095711 A1* | 4/2018 | Kanda | H04L 65/403 |
| 2018/0097795 A1* | 4/2018 | Kato | H04W 12/0608 |
| 2019/0325253 A1* | 10/2019 | Eikenes | G06K 9/6267 |

* cited by examiner

ANTENNA COIL 37

FIG. 8

| USER ID | CONTENT DATA | PERIOD OF TIME TO DISPLAY DATA | STATUS | 350 |
|---------|--------------|-------------------------------|--------|-----|
| 101 | xxyy.pdf | 14:00-15:00 | NOT DISPLAYED | |
| 102 | xxxx.pdf | 10:00-11:30 | BEING DISPLAYED | |
| ⋮ | ⋮ | ⋮ | ⋮ | |

FIG. 9

| USER ID | CARD ID | 360 |
|---------|---------|-----|
| 101 | xxxxx | |
| 102 | xxxxz | |
| ⋮ | ⋮ | |

FIG. 16A 450-1

| DATE OF USE | FLOOR NUMBER | MEETING ROOM NAME | START TIME | END TIME | USER ID | STATUS |
|---|---|---|---|---|---|---|
| 2018/01/30 | 2 | A | 9:30 | 10:30 | 123456 | RESERVED |
| 2018/01/30 | 2 | A | 11:00 | 12:30 | 123457 | RESERVED |
| 2018/01/30 | 2 | B | 9:30 | 10:30 | 123459 | RESERVED |
| ... | ... | ... | ... | ... | ... | ... |

FIG. 16B 450-2

| DATE OF USE | FLOOR NUMBER | MEETING ROOM NAME | START TIME | END TIME | USER ID | STATUS |
|---|---|---|---|---|---|---|
| 2018/01/30 | 2 | A | 9:32 | 10:30 | 123456 | IN USE |
| 2018/01/30 | 2 | A | 11:00 | 12:30 | 123457 | RESERVED |
| 2018/01/30 | 2 | B | 9:29 | 10:30 | 123459 | IN USE |
| ... | ... | ... | ... | ... | ... | ... |

FIG. 17

| USER ID | CONTENT DATA | DESTINATION MEETING ROOM NAME | RESERVATION TIME |
|---|---|---|---|
| 123456 | WB20180125-101531.pdf | A | 10:30 – 11 : 00 |
| 123457 | WB20180125-112445.pdf | – | – |
| 123459 | WB20180125-095526.pdf | B | 10:30 – 11 : 00 |
| ⋮ | ⋮ | ⋮ | ⋮ |

350A

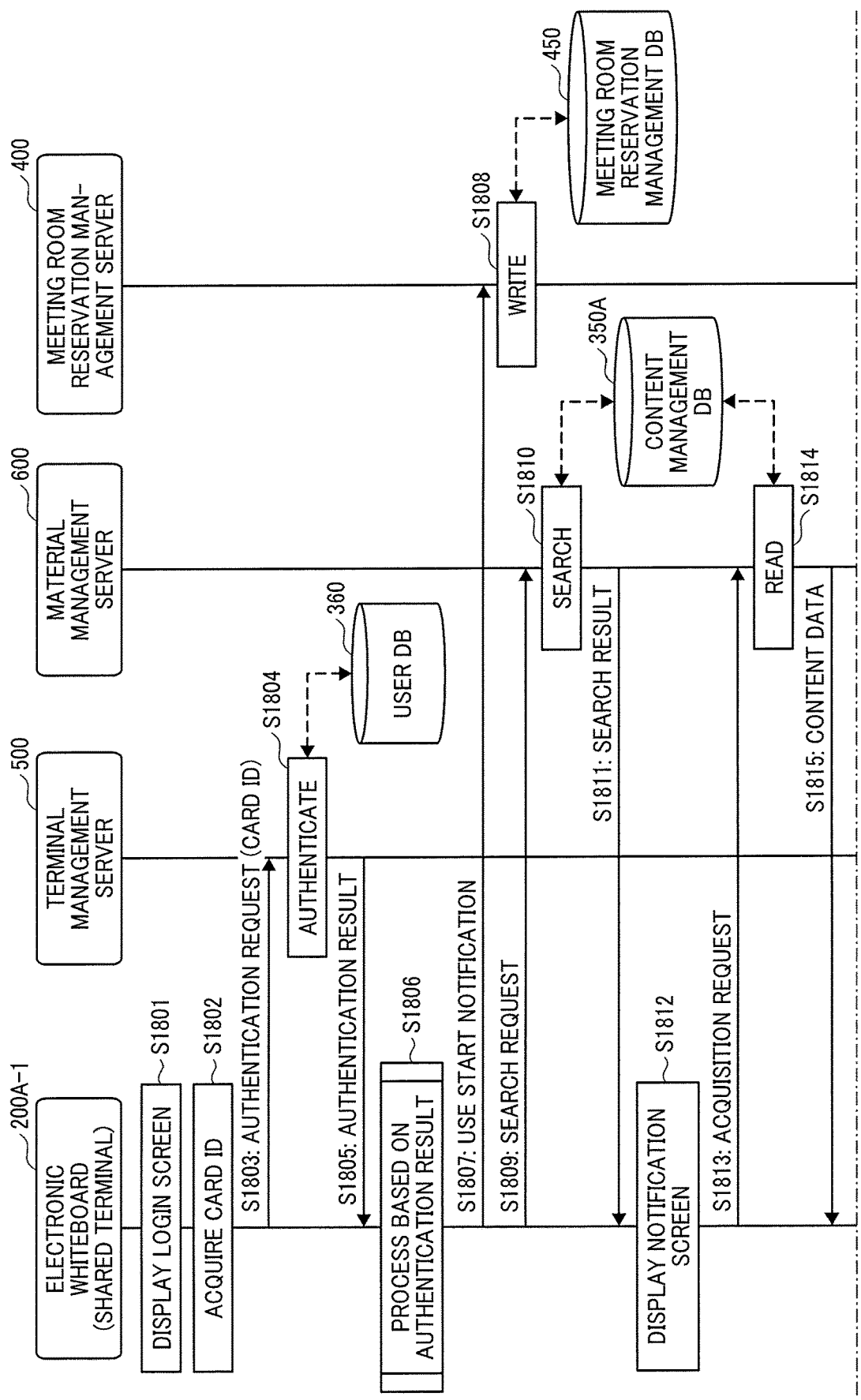

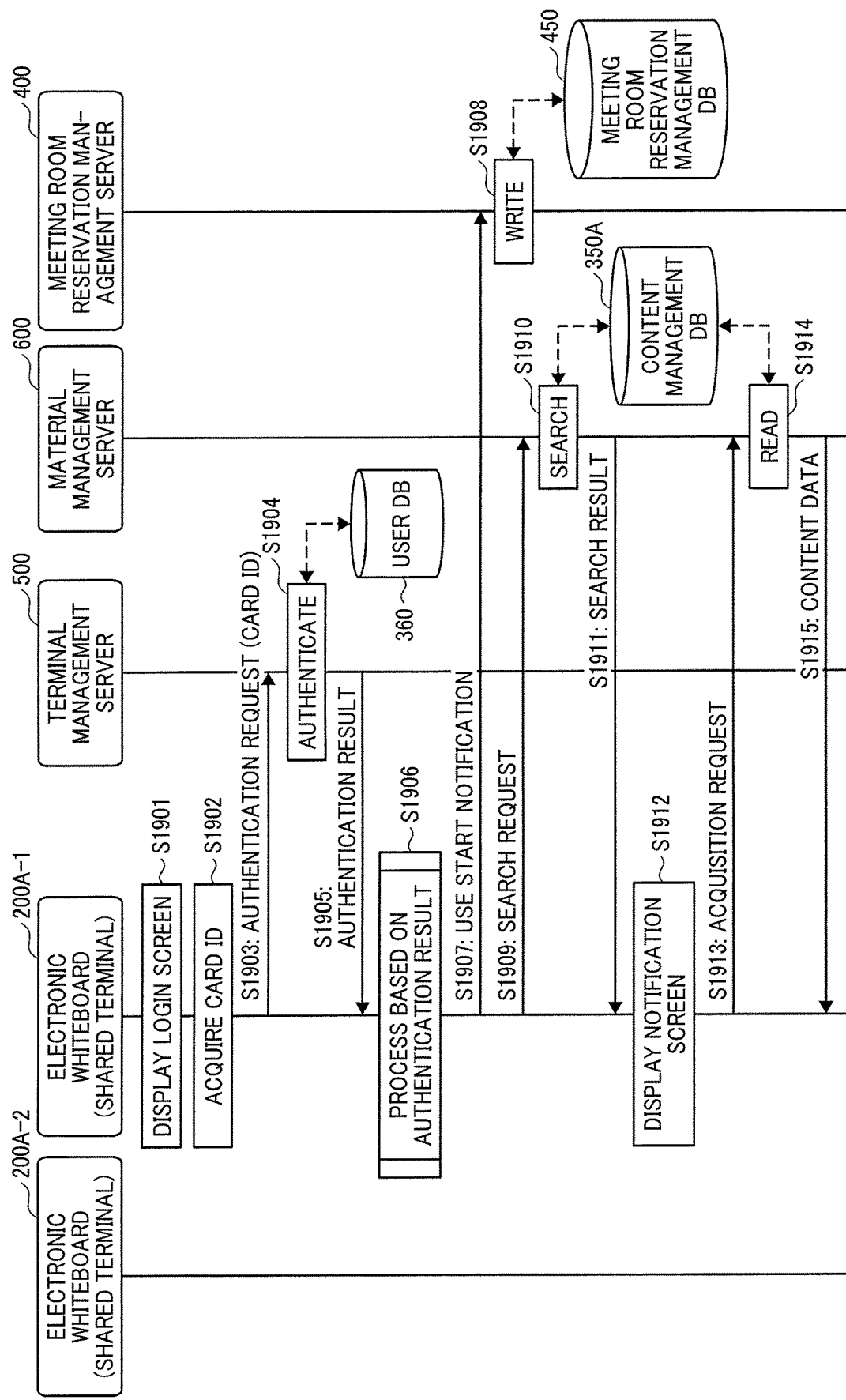

ELECTRONIC WHITEBOARD SYSTEM, ELECTRONIC WHITEBOARD, AND METHOD OF DISPLAYING CONTENT DATA

CROSS-REFERENCE TO RELATED APPLICATION

This patent application is based on and claims priority pursuant to 35 U.S.C. 119(a) to Japanese Patent Application No. 2018-047361, filed on Mar. 14, 2018, in the Japan Patent Office, the entire disclosure of which is hereby incorporated by reference herein.

BACKGROUND

Technical Field

Embodiments of the present disclosure relate to an electronic whiteboard system, an electronic whiteboard, and a method of displaying content data.

Related Art

In recent years, electronic whiteboards are installed in various places such as meeting rooms in companies and classrooms in educational institutions, and each electronic whiteboard is shared by a plurality of users. The electronic whiteboard is provided with a touch panel display of large size, and the touch panel display displays an image drawn with an electronic pen or user's finger by a user of the plurality of users. This enables the plurality of users to attend a meeting or a lecture while viewing the same images drawn by the user.

In addition, in recent years, a technique has been disclosed, in which a user having an integrated circuit (IC) card, which is a contactless IC card, is able to log in to a system including an apparatus by bringing the IC card in proximity to the apparatus.

A user can log in to a system including a conventional electronic whiteboard by using an IC card. However, in the conventional electronic whiteboard, data to be displayed and each user are not associated with each other.

SUMMARY

An exemplary embodiment of the present disclosure includes an electronic whiteboard system including at least one information processing system and at least one electronic whiteboard communicably connected to the at least one information processing system. The at least one information processing system stores, in a memory, content management information including one or more content management information records in each of which content data, user information, and information on a period of time are associated with each other. The content data is generated based on data displayed on a display of the at least one electronic whiteboard. The user information identifies a user of the at least one electronic whiteboard. The information on a period of time indicates a period of time to display the content data on the display of the at least one electronic whiteboard. The at least one electronic whiteboard reads, from a privately-owned terminal owned by a user, identification information corresponding to user information. The at least one electronic whiteboard transmits, to the at least one information processing system, the identification information and information on a time at which the identification information is read. The at least one electronic whiteboard receives, from the at least one information processing system, content data included in one of the one or more content management information records. The one of the one or more content management information records includes a period of time within which the time at which the identification information is read is included and user information identical to the user information corresponding to the identification information. The at least one electronic whiteboard displays, on the display, the content data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a conceptual diagram illustrating an example of a content management database, according to the first embodiment of the present disclosure;

FIG. 9 is a conceptual diagram illustrating an example of a user database, according to the first embodiment of the present disclosure;

FIG. 16A and FIG. 16B are conceptual diagram illustrating examples of a meeting room reservation management database according to the second embodiment of the present disclosure;

FIG. 17 is a conceptual diagram illustrating a content management database according to the second embodiment of the present disclosure;

FIG. 18A and FIG. 18B are a sequence diagram illustrating a process performed by the electronic whiteboard system according to the second embodiment of the present disclosure;

FIG. 19A to FIG. 19C are a sequence diagram illustrating another process performed by the electronic whiteboard system according to the second embodiment of the present disclosure;

Figure 1:
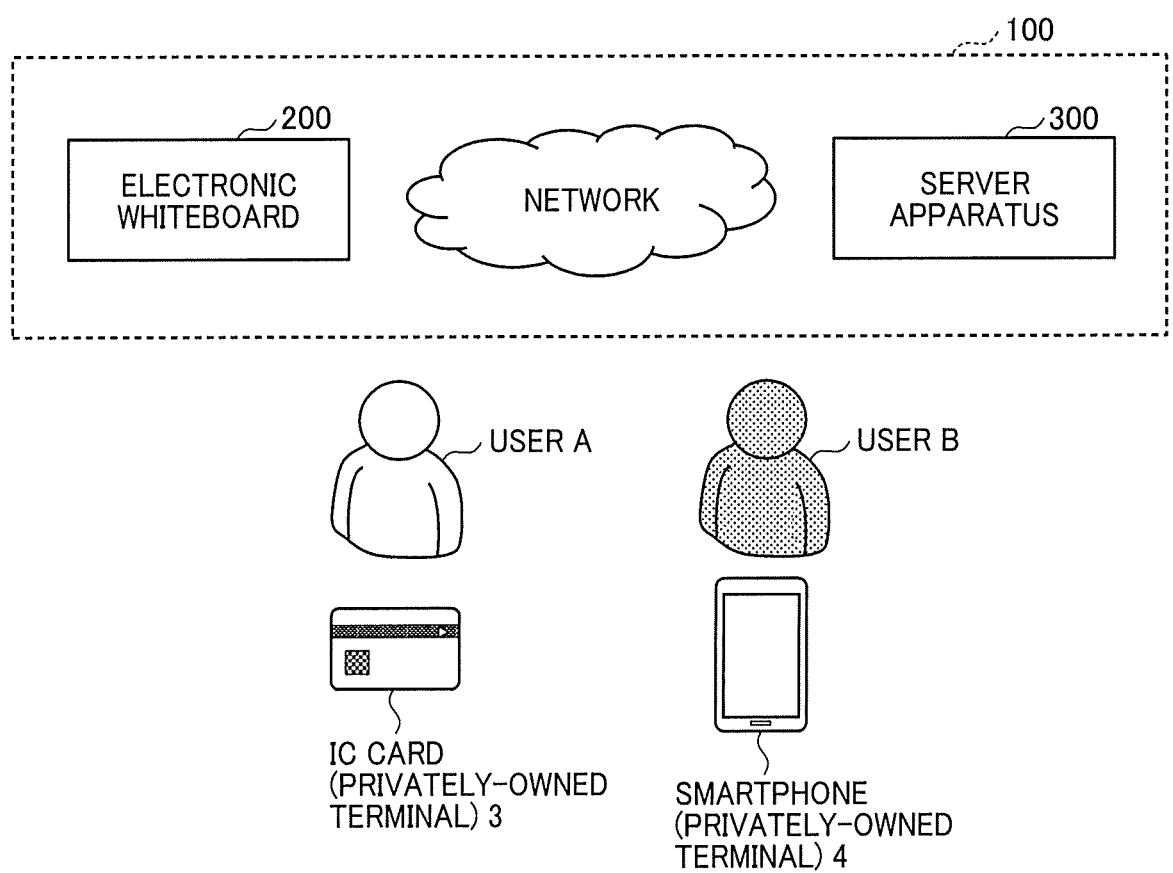
FIG. 1 is a diagram illustrating an example of a system configuration of an electronic whiteboard system according to a first embodiment of the present disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

First Embodiment

A first embodiment of the present disclosure is described below with reference to attached drawings. FIG. 1 is a diagram illustrating an example of a system configuration of an electronic whiteboard system according to the first embodiment of the present disclosure.

The electronic whiteboard system 100 according to the present embodiment includes an electronic whiteboard 200 and a server apparatus 300. In the electronic whiteboard system 100, the electronic whiteboard 200, and the server apparatus 300 are connected to each other through a network such as the Internet.

In addition, in the electronic whiteboard system 100 according to the present embodiment, when a user holds a privately-owned terminal over (a card reader, sensor, or the like of) the electronic whiteboard 200, the electronic whiteboard 200 reads identification information for identifying the user from the privately-owned terminal. The electronic whiteboard 200, then, transmits the identification information to the server apparatus 300. Then, the server apparatus 300 authenticates the user based on the identification information.

The privately-owned terminal according to the present embodiment may be, for example, a contactless integrated circuit (IC) card 3 or a smartphone 4, as illustrated in FIG. 1. Each of the IC card 3 and the smartphone 4 is an example of the privately-owned terminal that is privately owned by each user.

In the example of FIG. 1, information for identifying a user A is stored in the IC card 3. More specifically, the identification information stored in the IC card 3 is associated with information for identifying the user A in the server apparatus 300.

In addition, the smartphone 4 stores information for identifying a user B. More specifically, a terminal identifier (ID) for identifying the smartphone 4 and information for specifying the user B are associated with each other in the server apparatus 300. In the following description, information for identifying a user is referred to as a user ID. That is, the user ID is user information for identifying a user.

In the electronic whiteboard system 100 according to the present embodiment, the server apparatus 300 stores, in advance, data to be displayed on the electronic whiteboard 200, a user ID, and a period of time scheduled to display the data, in association with each other. The period of time indicates a time width, namely, a time range from a certain time to another certain time.

In the electronic whiteboard system 100, when the user A holds the IC card 3 over the electronic whiteboard 200 and then authenticated by the server apparatus 300, the server apparatus 300 causes the electronic whiteboard 200 to display data that is corresponding to both of the user A and a time at which the IC card 3 is held over the electronic whiteboard 200, for example.

With the above-described configuration, the electronic whiteboard system 100 according to the present embodiment is not required to perform an operation step of identifying a storage area storing desired data and reading the desired data from the storage area, and thereby displaying the desired data on the electronic whiteboard 200 easily after a user logs in to the electronic whiteboard system 100 by holding the privately-owned terminal over the electronic whiteboard 200.

Figure 2:
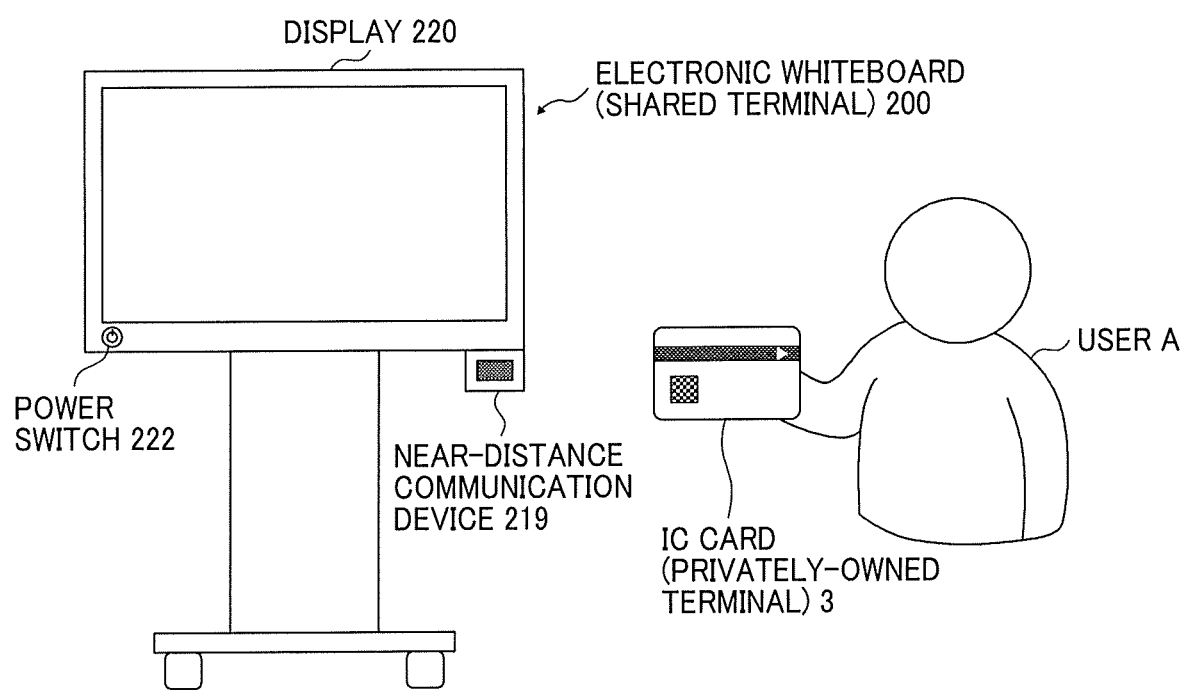
FIG. 2 is a diagram illustrating that a user uses an electronic whiteboard according to an embodiment of the present disclosure.

FIG. 2 is a diagram illustrating that the user A uses the electronic whiteboard 200, according to the present embodiment. In the example of FIG. 2, the user A logs in to the electronic whiteboard system 100 using the IC card 3.

The electronic whiteboard 200 includes a near-distance communication device 219. In the present embodiment, the user A moves to a place where the electronic whiteboard 200 is installed and have the IC card 3 be in proximity to the near-distance communication device 219 of the electronic whiteboard 200, as illustrated in FIG. 2.

Then, the electronic whiteboard 200 acquires a card ID for identifying the IC card 3 from the IC card 3 and transmits the card ID to the server apparatus 300. The server apparatus 300 permits the user A to log in to the electronic whiteboard system 100 when the card ID and the user ID are associated with each other in the server apparatus 300.

A description is now given of a hardware configuration of the devices (e.g., the electronic whiteboard 200 and the server apparatus 300) included in the electronic whiteboard system 100 and the privately-owned terminal (e.g., IC card 3 and the smartphone 4), with reference to FIG. 3 to FIG. 6.

Figure 3:
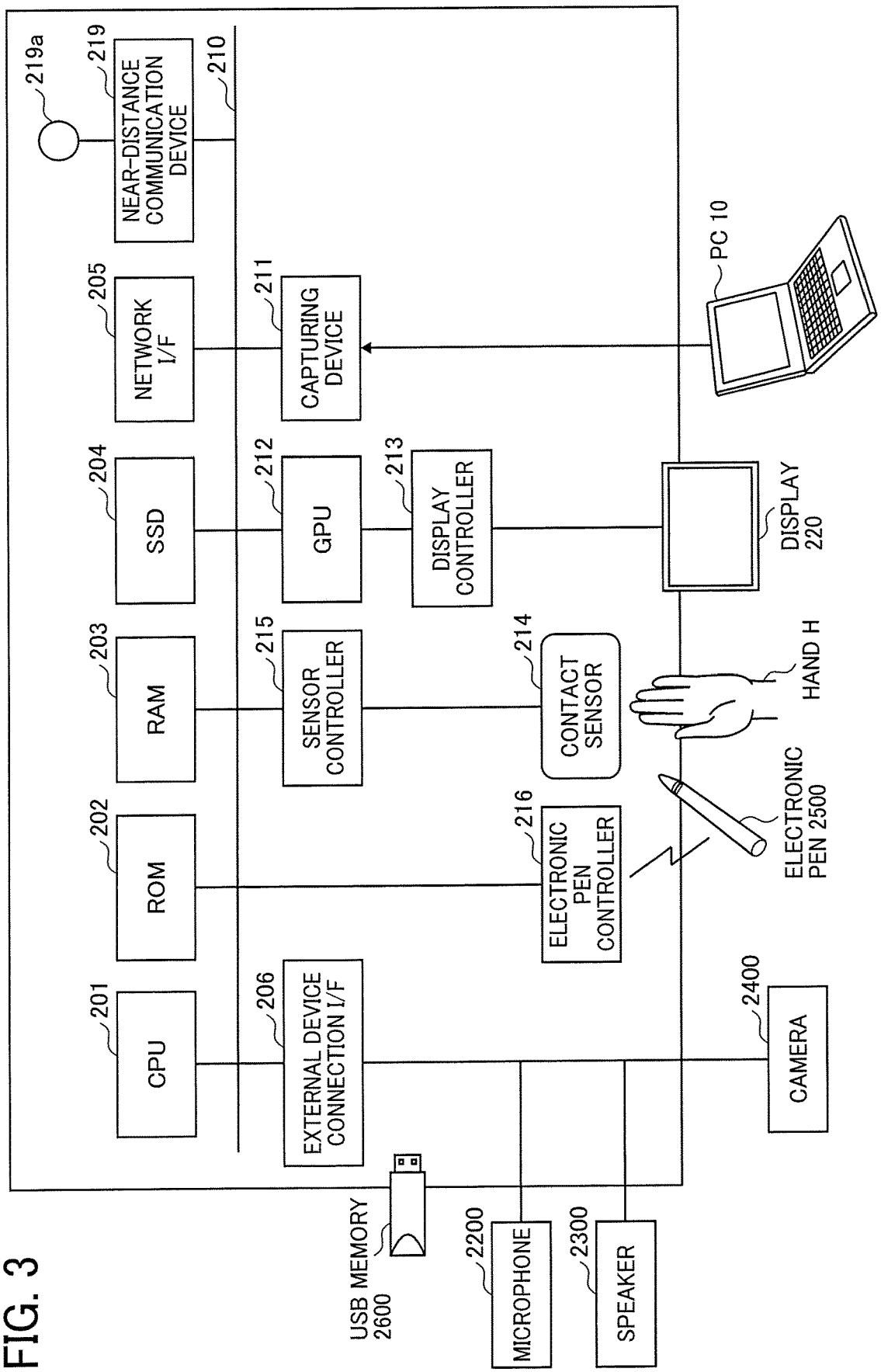
FIG. 3 is a block diagram illustrating an example of a hardware configuration of the electronic whiteboard according to the first embodiment of the present disclosure.

FIG. 3 is a block diagram illustrating an example of the hardware configuration of the electronic whiteboard 200 according to the first embodiment. The electronic whiteboard 200 includes a central processing unit (CPU) 201, a read only memory (ROM) 202, a random access memory (RAM) 203, a solid state drive (SSD) 204, a network interface (I/F) 205, and an external device connection I/F 206. The electronic whiteboard 200 is a shared terminal that is used to share information by a plurality of users.

The CPU 201 controls the overall operation of the electronic whiteboard 200. The ROM 202 stores a control program for operating the CPU 201 such as an Initial Program Loader (IPL). The RAM 203 is used as a work area for the CPU 201. The SSD 204 stores various data such as a control program for an electronic whiteboard. The network I/F 205 controls communication with an external device through a network. The external device connection I/F 206 controls communication with a universal serial bus (USB) memory 2600, and external devices such as a camera 2400, a speaker 2300, a microphone 2200, etc.

The electronic whiteboard 200 further includes a capturing device 211, a graphics processing unit (GPU) 212, a display controller 213, a contact sensor 214, a sensor controller 215, an electronic pen controller 216, the near-distance communication device 219, and an antenna 219a for the near-distance communication device 219.

The capturing device 211 causes a display of a PC 10 to display a still image or a video image based on image data that is captured by the capturing device 211. The GPU 212 is a semiconductor chip dedicated to graphics. The display controller 213 controls and manages screen display to output an image processed by the GPU 212 to a display 220, for example.

The contact sensor 214 detects a touch onto the display 220 with an electronic pen 2500 or a user's hand H. The sensor controller 215 controls the contact sensor 214. The contact sensor 214 inputs and senses a coordinate by an infrared blocking system. More specifically, the display 220 is provided with two light receiving elements disposed on both upper side ends of the display 220, and a reflector frame disposed at the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame.

The contact sensor 214 outputs an ID of the infrared ray that is blocked by an object after being emitted from the two light receiving elements, to the sensor controller 215. Based on the ID of the infrared ray, the sensor controller 215 detects a specific coordinate that is touched by the object. The electronic pen controller 216 communicates with the electronic pen 2500 to detect a touch by the tip or bottom of the electronic pen 2500 to the display 220. The near-distance communication device 219 is a communication circuit that communicates in compliance with the near field communication (NFC), the Bluetooth (registered trademark) or the like.

The electronic whiteboard 200 further includes a bus line 210. Examples of the bus line 210 include an address bus and a data bus, which electrically connect the components including the CPU 201, one another.

The contact sensor 214 is not limited to the infrared blocking system type, and may be a different type of detector, such as a capacitance touch panel that identifies a contact position by detecting a change in capacitance, a resistance film touch panel that identifies a contact position by detecting a change in voltage of two opposed resistance films, or an electromagnetic induction touch panel that identifies a contact position by detecting electromagnetic induction caused by contact of an object to a display. In addition to or in alternative to detecting a touch by the tip or bottom of the electronic pen 2500, the electronic pen controller 216 may also detect a touch by another part of the electronic pen 2500, such as a part held by a hand of the user.

Figure 4:
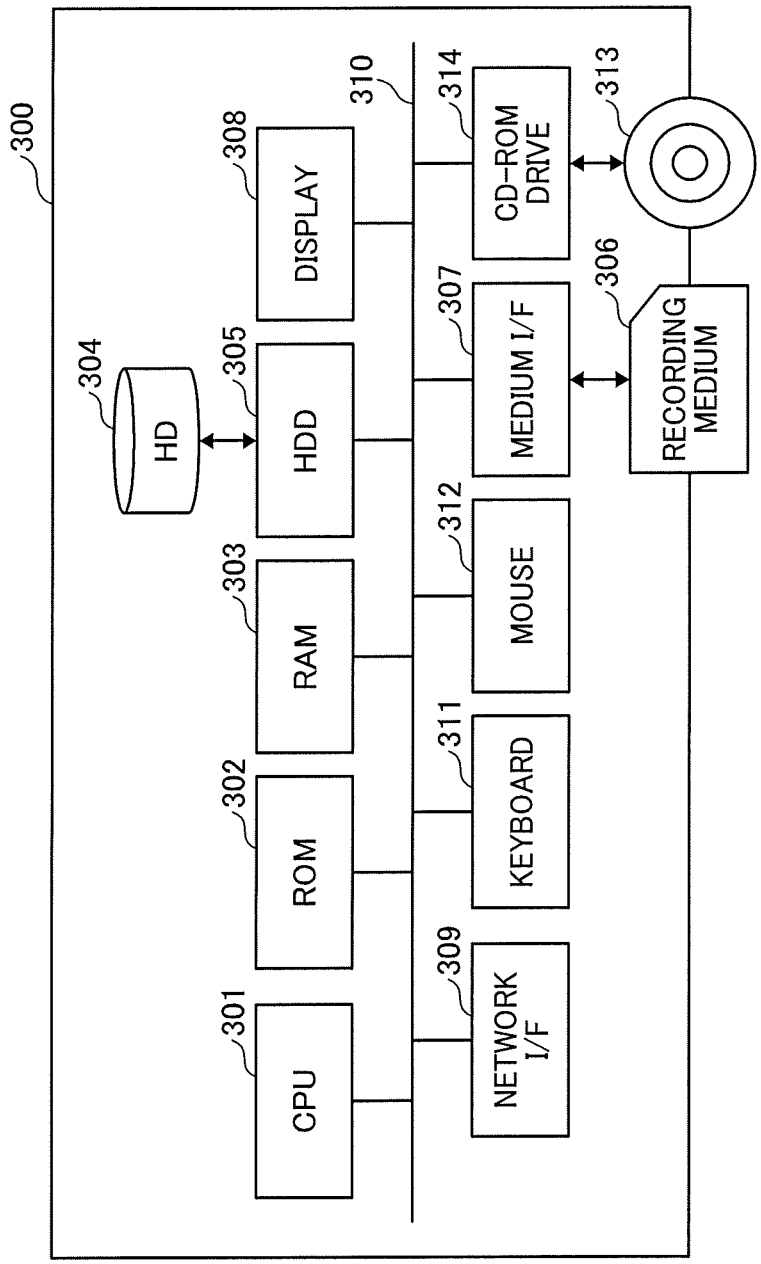
FIG. 4 is a block diagram illustrating an example of a hardware configuration of a server apparatus according to the first embodiment of the present disclosure.

FIG. 4 is a block diagram illustrating an example of the hardware configuration of the server apparatus 300 according to the first embodiment of the present disclosure. The server apparatus 300 includes a CPU 301, a ROM 302, a RAM 303, a hard disk (HD) 304, a hard disk drive (HDD) 305, a recording medium 306, a medium I/F 307, a display 308, a network IN 309, a keyboard 311, a mouse 312, a compact-disc read only memory (CD-ROM) drive 314, and a bus line 310.

The CPU 301 controls the entire operation of the terminal management server 5. The ROM 302 stores a control program such as an IPL used for operating the CPU 301. The RAM 303 is used as a work area for the CPU 301. The HD 304 stores various data such as a program. The HDD 305 controls reading and writing of data from and to the HD 304 under control of the CPU 301.

The medium I/F 307 controls reading or writing (storing) of data with respect to a recording medium 306 such as a flash memory. The display 308 displays various information such as a cursor, a menu, a window, a character, or an image. The network I/F 309 is an interface that transmits or receives data through a communication network.

The keyboard 311 is an input device that is provided with a plurality of keys for enabling a user to input characters, numerals, or various instructions. The mouse 312 is another input device that enables a user to select a specific instruction or execution, select a target for processing, or move a cursor being displayed. The CD-ROM drive 314 reads or writes various data with respect to a compact disc ROM (CD-ROM) 313, which is one example of removable recording medium. The bus line 310 is an address bus or a data bus, which electrically connects the hardware resources illustrated in FIG. 4 such as the CPU 301.

Figure 5:
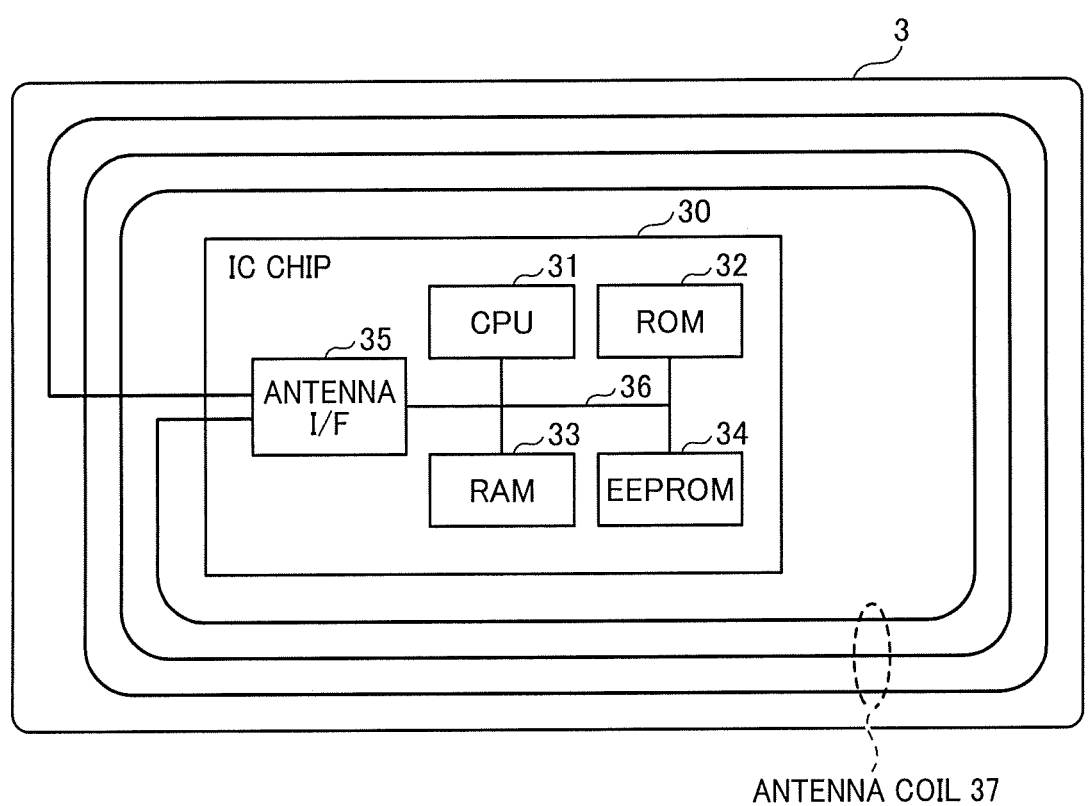
FIG. 5 is a diagram illustrating an example of a hardware configuration of an integrated circuit (IC) card according to the first embodiment of the present disclosure.

FIG. 5 is a diagram illustrating an example of the hardware configuration of the IC card 3 according to the first embodiment of the present disclosure. In the present embodiment, a contactless IC card is used to describe the IC card 3. In some of the embodiments, a contact IC card is used as the IC card 3. The IC card 3 includes an IC chip 30 and an antenna coil 37. The IC chip 30 further includes a CPU 31, a ROM 32, a RAM 33, an Electrically Erasable and Programmable ROM (EEPROM) 34, and an antenna I/F 35.

The CPU 31 controls the overall operation of the IC card 3. The ROM 32 stores a program used for controlling the CPU 31. The RAM 33 is used as a work area of the CPU 31. The EEPROM 34 stores various data such as the program for the IC card 3, and a terminal ID for identifying the IC card 3, and the like. The antenna I/F 35 transmits and receives data to and from an external device via the antenna coil 37.

The IC card 3 further includes a bus line 36. Examples of the bus line 36 include an address bus and a data bus, which electrically connect the components including the CPU 31, one another.

The antenna coil 37 generates an electric current by receiving magnetism, when the IC card 3 passes an electromagnetic field generated by radio waves emitted from an external device such as a reader and writer. The IC card 3 uses the generated electric current to activate the IC chip 30, and communicates with the external device, such as a reader or a writer, to obtain and provide data from and to the external device.

Figure 6:
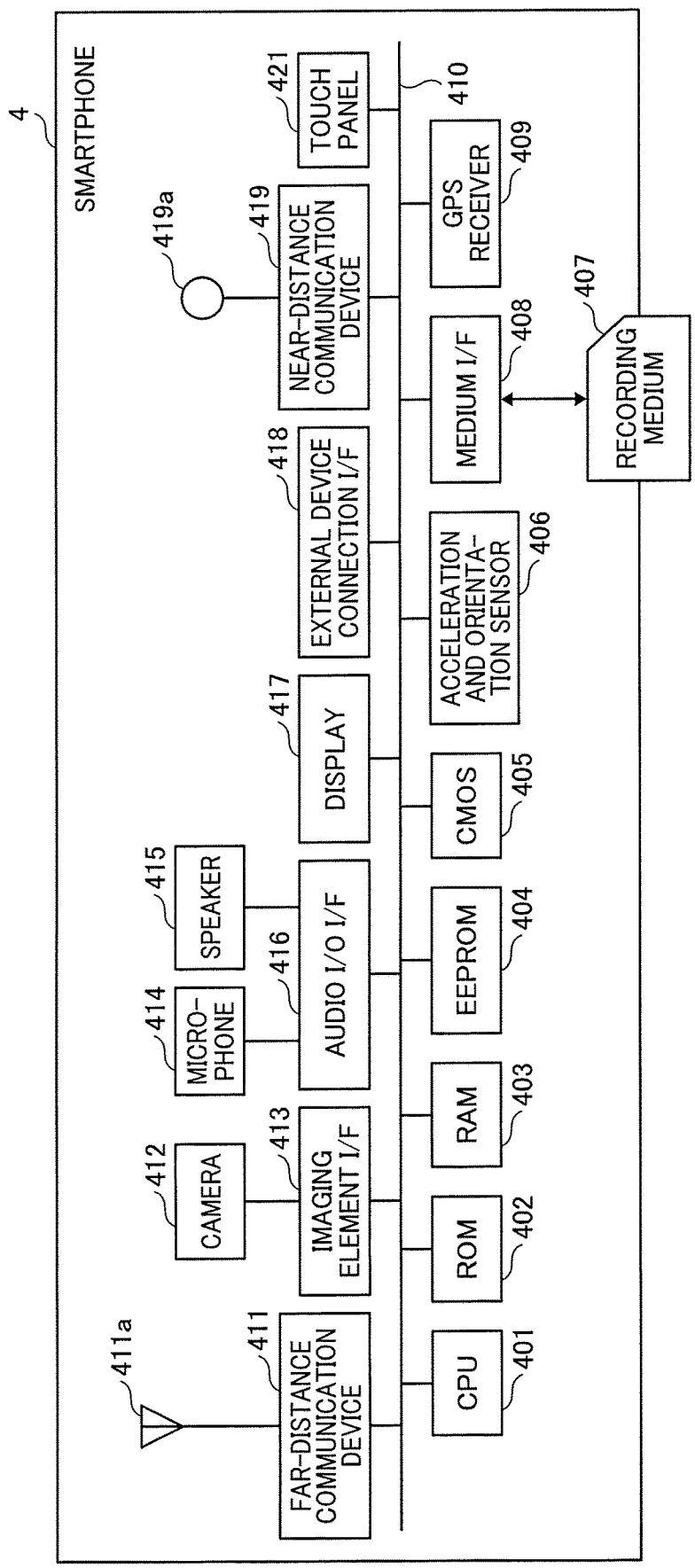
FIG. 6 is a block diagram illustrating an example of a hardware configuration of a smartphone according to the first embodiment of the present disclosure.

FIG. 6 is a block diagram illustrating an example of the hardware configuration of the smartphone 4 according to the first embodiment of the present disclosure.

The smartphone 4 includes a CPU 401, a ROM 402, a RAM 403, an EEPROM 404, a complementary metal oxide semiconductor (CMOS) sensor 405, an acceleration and orientation sensor 406, a medium I/F 408, and a global positioning system (GPS) receiver 409.

The CPU 401 controls the overall operation of the smartphone 4. The ROM 402 stores a control program for operating the CPU 401 such as an IPL. The RAM 403 is used as a work area for the CPU 401. The EEPROM 404 reads or writes various data such as a control program for the smartphone 4 under control of the CPU 401.

The CMOS sensor 405 captures a subject (mainly, a self-image of a user operating the smartphone 4) under control of the CPU 401 to obtain image data. The acceleration and orientation sensor 406 includes various sensors such as an electromagnetic compass and gyrocompass, each of which detects geomagnetism, and an acceleration sensor. The medium I/F 408 controls reading or writing of data with respect to a recording medium 407 such as a flash memory. The GPS receiver 409 receives a GPS signal from a GPS satellite.

The smartphone 4 further includes a far-distance communication device 411, a camera 412, an imaging element I/F 413, a microphone 414, a speaker 415, an audio input/output (I/O) I/F 416, a display 417, an external device connection I/F 418, a near-distance communication device 419, an antenna 419a for the near-distance communication device 419, and a touch panel 421.

The far-distance communication device 411 is a circuit that communicates with other devices through a network. The camera 412 is an example of an imaging device capable of capturing a subject to obtain image data under control of the CPU 401 and is incorporated in the smartphone 4. The imaging element I/F 413 is a circuit that controls driving of the camera 412. The microphone 414 is an example of audio collecting device capable of inputting audio under control of the CPU 401 and is incorporated in the smartphone 4.

The audio I/O I/F 416 is a circuit for inputting and outputting an audio signal between the microphone 414 and the speaker 415 under control of the CPU 401. The display 417 includes a liquid crystal or organic electro luminescence (EL) display that displays an image of a subject, an operation icon, or the like. The external device connection I/F 418 is an interface circuit that connects the smartphone 4 to various external devices. The near-distance communication device 419 is a communication circuit such as the NFC, the Bluetooth, or the like. The touch panel 421 is an example of an input device that enables the user to input a user instruction to the smartphone 4 by touching a screen of the display 417.

The smartphone 4 further includes a bus line 410. The bus line 410 is an address bus or a data bus that electrically connects the elements in FIG. 4, such as the CPU 401, to each other.

Figure 7:
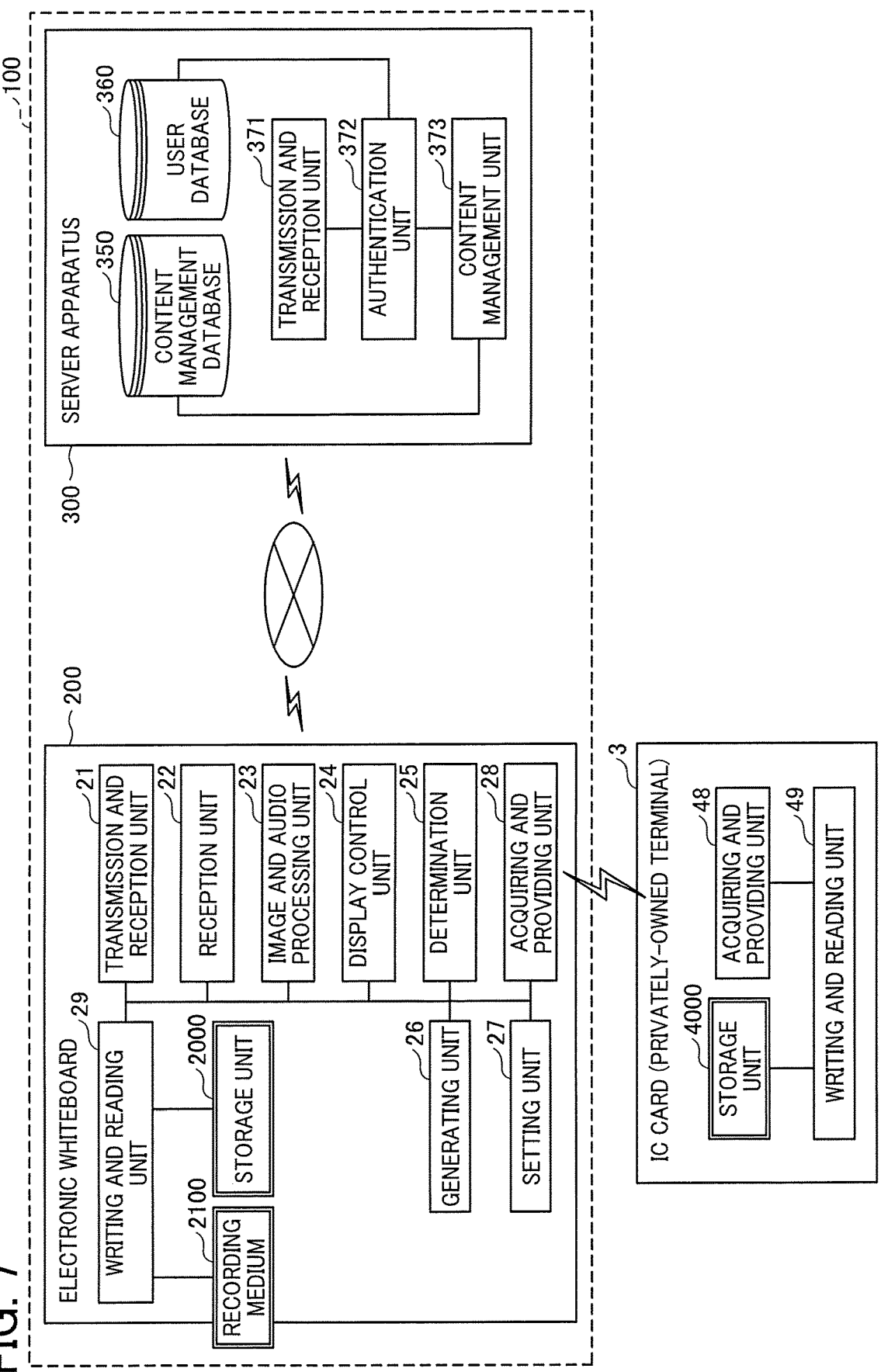
FIG. 7 is a block diagram illustrating functions of each devices included in the electronic whiteboard system according to the first embodiment of the present disclosure.

A description is now given of functions of each devices included in the electronic whiteboard system 100, with reference to FIG. 7. FIG. 7 is a block diagram illustrating the functions of each devices included in the electronic whiteboard system 100 according to the first embodiment of the present disclosure.

A description is now given of functions of the electronic whiteboard 200.

The electronic whiteboard 200 includes a transmission and reception unit 21, a reception unit 22, an image and audio processing unit 23, a display control unit 24, a determination unit 25, a generating unit 26, a setting unit 27, an acquiring and providing unit 28, and a writing and reading unit 29. Each of the above-mentioned functional units is implemented by the CPU 201 executing a program read out from the SSD 204, etc. The electronic whiteboard 200 according to the present embodiment further includes a storage unit 2000. The storage unit 2000 is implemented by a storage device, such as the SSD 204, which is included in the electronic whiteboard 200.

The transmission and reception unit 21 transmits or receives data (information) to or from the server apparatus 300 through a network. That is, transmission and reception unit 21 has a role of a transmission unit (transmitter) that transmits various types of information from the electronic whiteboard 200 to the server apparatus 300 and a role of a reception unit (receiver) that receives various types of information from the server apparatus 300. The reception unit 22, which is implemented by the contact sensor 214 and the electronic pen controller 216, receives various inputs from the user.

The image and audio processing unit 23 processes image data that is acquired by capturing a subject by the camera 2400. After sound generated by the user is converted into an audio signal by the microphone 2200, the image and audio processing unit 23 performs processing on audio data according to the audio signal. The image and audio processing unit 23 further outputs the audio signal according to the audio data to the speaker 2300, and the speaker 2300 outputs audio.

The image and audio processing unit 23 acquires drawing image data, which is drawn by the user with the electronic pen 2500 or the user's hand H onto the display 220, and converts the drawing image data to coordinate data. For example, when one of the electronic whiteboards 200 in one site transmits coordinate data to another one of the electronic whiteboards 200 in another site, the other electronic whiteboard 200 causes the display 220 to display a drawing image having the same content with an image drawn on the one electronic whiteboard 200 based on the received coordinate data.

The display control unit 24 displays a drawing image on the display 220. The determination unit 25 determines whether a terminal ID is received from the IC card 3 or the smartphone 4 or not.

The generating unit 26 generates image data in a portable document format (PDF) based on drawing image data in a bitmap format acquired according to an image drawn by the user. The generating unit 26 generates image data in a RPCS (registered trademark) format based on image data in a bitmap format acquired according to an image drawn by the user. In addition, the image data generated by the generating unit 26 may be in any suitable format, such as a page description language (PDL) format or a post script (PS) format, which is other than the RPCS format.

In the following description, the image data generated by the generating unit 26 is also referred to as content data. In addition, the content data according to the present embodiment includes various types of data transmitted from the electronic whiteboard 200 to the server apparatus 300. In other words, the content data according to the present embodiment includes any one or any combination of audio data, image data, video data and stroke information, etc.

The setting unit 27 sets various types of settings of the electronic whiteboard 200, such as settings for a transmission destination of the image data.

The acquiring and providing unit 28 acquires or provides data from or to a privately-owned terminal such as the IC card 3 or the smartphone 4 by a near-range communication. The communication is implemented by the near-distance communication device 219 and the antenna 219a. That is, the acquiring and providing unit 28 plays a role of a reading unit (reader) that reads identification information stored in the privately-owned terminal from the privately-owned terminal.

The writing and reading unit 29 stores various types of data in the storage unit 2000 or the recording medium 2100 or reads various types of data stored in the storage unit 2000 or the recording medium 2100. In addition, the storage unit 2000 overwrites the image data and the audio data each time when the image data and the audio data are received in communicating with other electronic whiteboard or videoconference terminal. The recording medium 2100 is implemented by the USB memory 2600, for example.

A description is now given of functions of the server apparatus 300. The server apparatus 300 according to the present embodiment includes a content management database 350, a user database 360, a transmission and reception unit 371, an authentication unit 372, and a content management unit 373.

The content management database 350 and the user database 360 are implemented by a storage device such as the HD 304.

The transmission and reception unit 371, the authentication unit 372, and the content management unit 373 are implemented by the CPU 301 reading a program stored in the ROM 302 or the like and executing the program.

In the content management database 350, content data received from the electronic whiteboard 200 and a user ID for specifying the user are stored in association with each other.

In the user database 360, identification information for identifying the corresponding privately-owned terminal and a user ID are stored in association with each other. The content management database 350 and the user database 360 may be provided in the server apparatus 300 in advance. A detailed description of each of the content management database 350 and the user database 360 is deferred.

The transmission and reception unit 371 transmits or receives data to or from the electronic whiteboard 200 thorough a network.

When receiving, from the electronic whiteboard 200, identification information, which is previously read from a privately-owned terminal by the electronic whiteboard 200, the authentication unit 372 refers to the user database 360 and authenticates the user of the privately-owned terminal. More specifically, the authentication unit 372 determines whether a user ID associated with the received identification information is stored in the user database 360 or not. When the corresponding user ID is stored in the user database 360, the authentication of the user of the privately-owned terminal succeeds. In addition, When the corresponding user ID is not stored in the user database 360, the authentication of the user of the privately-owned terminal performed by the authentication unit 372 fails.

The content management unit 373 refers to the content management database 350, identifies content data associated with the user ID of the user successfully authenticated by the authentication unit 372, and causes the transmission and reception unit 371 to transmit the content data to the electronic whiteboard 200.

In the description of the embodiment, the number of the server apparatus 300 according to the present embodiment is one, however, the embodiments are not intended to be limited to this. In some embodiments, the server apparatus 300 may be an information processing system including a plurality of apparatuses.

A description is now given of functions of the privately-owned terminal. As an example of the privately-owned terminal, functions of the IC card 3 are described, with reference to FIG. 7.

The IC card 3 includes an acquiring and providing unit 48, a writing and reading unit 49, and a storage unit 4000. The acquiring and providing unit 48 acquires or provides data from or to the electronic whiteboard 200 using short-distance communication.

The writing and reading unit 49 stores various types of data in the storage unit 4000 or reads various types of data stored in the storage unit 4000. In addition, the storage unit 4000 stores a card ID for identifying the IC card 3. The storage unit 4000 is implemented by a storage device, such as the ROM 32, which is included in the IC chip 30 of the IC card 3.

A description is now given of each of the content management database 350 and the user database 360, with reference to FIG. 8 and FIG. 9.

FIG. 8 is a conceptual diagram illustrating an example of the content management database 350, according to the first embodiment of the present disclosure. The content management database 350 according to the present embodiment stores records of data each of which includes items of information of "user ID", "content data", "period of time to display data", and "status". In each record in the content management database 350, the item of "user ID" is associated with each of the other items. In the following description, information of record including a value of the item of "user ID" and the values of the other items in the content management database 350 is also referred to as a content management information record. In other words, the content management database 350 according to the present embodiment functions as a content management unit that stores the content management information.

The item of "user ID" indicates information for identifying a user of a privately-owned terminal. A value of the item of "content data" is data stored in a state displayable on the electronic whiteboard 200.

A value of the item of "period of time to display data" is information that is stored when the content data is stored in the content management database 350 and indicates a period of time scheduled to display a corresponding content data on the electronic whiteboard 200. A value of the item of "Status" indicates a status of corresponding data, which is whether the corresponding data is currently displayed or not.

In the example of FIG. 8, a user ID of "101" is associated with content data of "xxyy. pdf". In addition, the user ID of "101" is associated with a card ID of "xxxxx", as illustrated in FIG. 9, which is described later. In addition, in the example of FIG. 8, a period of time to display the content data of "xxyy.pdf" on the electronic whiteboard 200 is 14:00-15:00, and the content data of "xxyy.pdf" is not currently displayed on the electronic whiteboard 200.

In addition, the items of information included in the content management database 350 are not limited to those illustrated in FIG. 8 and may include items other than the items illustrated in FIG. 8. More specifically, for example, in the content management database 350, a terminal ID of the electronic whiteboard 200 for identifying the electronic whiteboard 200 that is to display the content data may be also stored as an item of information.

FIG. 9 is a conceptual diagram illustrating an example of the user database 360 according to the first embodiment of the present disclosure. The user database 360 according to the present embodiment has items of information of "user ID" and "card ID", and the items of information are associated with each other in a record. In the example of FIG. 9, as an example of the identification information of the privately-owned terminal, a card ID is used. In the example of FIG. 9, the user ID of "101" is associated with the card ID of "xxxxx". In other words, the user database 360 according to the present embodiment functions as a user management unit that stores each card ID, which is the identification information of the corresponding privately-owned terminal, and user information for identifying a user of the electronic whiteboard 200, in association with each other.

In the example of FIG. 9, the item of information stored in the user database 360 are "user ID" and "card ID", however, the embodiments are not intended to be limited to this. The user database 360 may have items other than the items illustrated in FIG. 9 as items of information.

Figure 10:
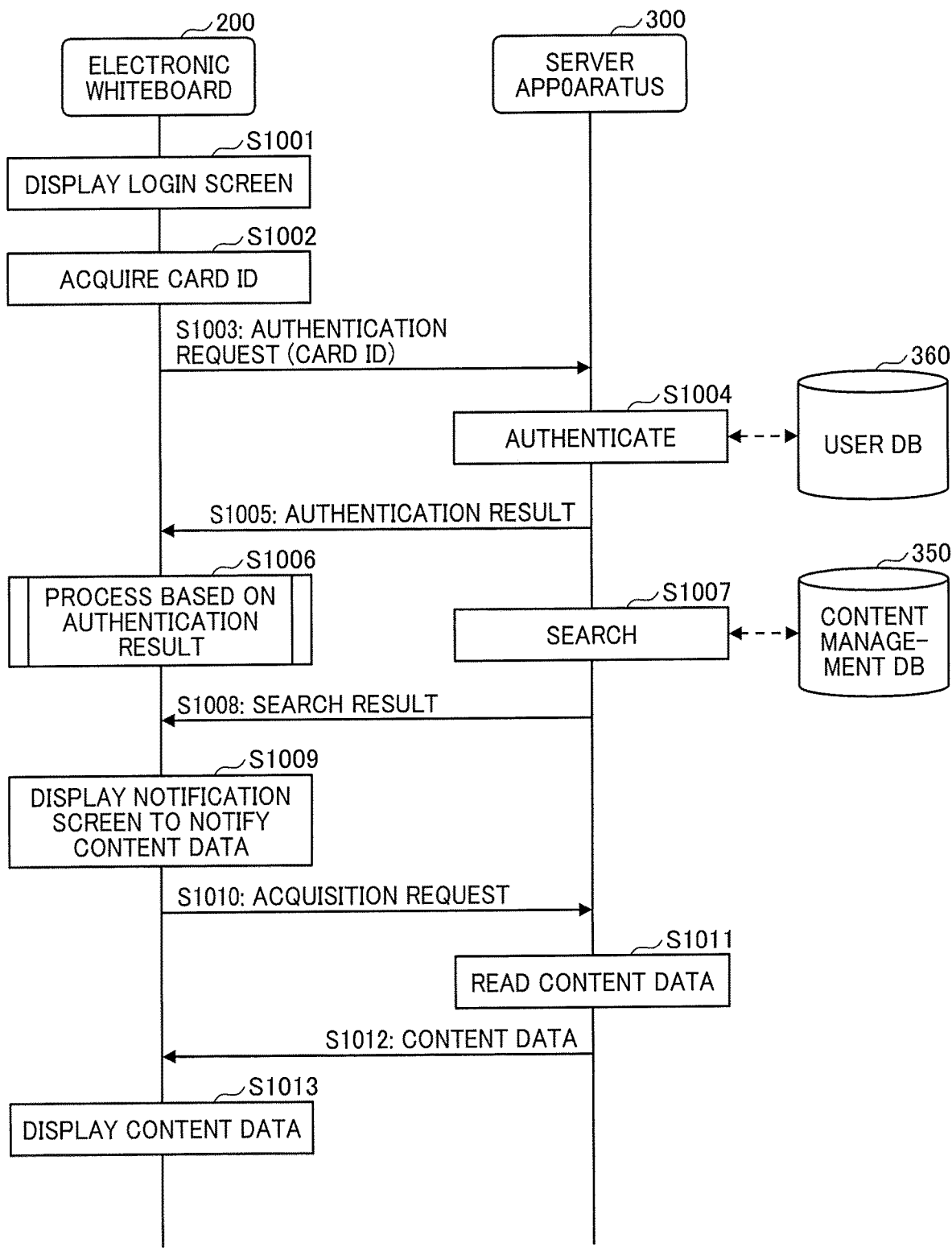
FIG. 10 is a sequence diagram illustrating a process performed by the electronic whiteboard system according to the first embodiment of the present disclosure.

A description is now given of the operation of the electronic whiteboard system 100 according to the present embodiment, with reference to FIG. 10. FIG. 10 is a sequence diagram illustrating a process performed by the electronic whiteboard system 100 according to the first embodiment of the present disclosure.

In the electronic whiteboard system 100 according to the present embodiment, the display control unit 24 of the electronic whiteboard 200 displays a login screen on the display 220 (Step S1001). Subsequently, the acquiring and providing unit 28 of the electronic whiteboard 200 acquires the card ID from the IC card 3 (Step S1002).

Subsequently, the transmission and reception unit 21 of the electronic whiteboard 200 transmits the received card ID to the server apparatus 300 (Step S1003). In other words, the electronic whiteboard 200 requests for authentication of the user of the IC card 3 by transmitting the card ID to the server apparatus 300.

Upon receiving the card ID by the transmission and reception unit 371, the authentication unit 372 of the server apparatus 300 refers to the user database 360 and authenticates the user of the IC card 3 (Step S1004). In other words, the authentication unit 372 determines whether the received card ID is associated with the user ID in the user database 360 or not.

Subsequently, the transmission and reception unit 371 of the server apparatus 300 transmits a result of the authentication performed by the authentication unit 372 to the electronic whiteboard 200 (Step S1005). Hereinafter, the result of authentication is also referred to as the authentication result. More specifically, the server apparatus 300 may transmit the user ID to the electronic whiteboard 200 as the authentication result. In the example of FIG. 10, the authentication of the user succeeds. However, if the authentication of the user failed, the server apparatus 300 transmits a notification indicating a failure of the authentication to the electronic whiteboard 200.

When the authentication is successful, the electronic whiteboard 200 executes processing based on the authentication result (Step S1006). More specifically, when the transmission and reception unit 21 of the electronic whiteboard 200 receives, from the server apparatus 300, a notification indicating that the authentication has been successfully performed, the display control unit 24 of the electronic whiteboard 200 displays, on the display 220, a screen on which a user can input handwriting (whiteboard). Hereinafter, the screen on which a user can input handwriting is also referred to as a screen for handwriting input.

Alternatively, when the electronic whiteboard 200 receives a notification indicating a failure of the authentication, the display 220 may displays a message indicating that authentication has failed, for example.

When the authentication is successful, the content management unit 373 of the server apparatus 300 searches the content management database 350 using the user ID corresponding to the received card ID and the time at which the card ID was received as a key (Step S1007).

In S1007, the content management unit 373 determines whether there is a content management information record, in the content management database 350, including both of a user ID identical to the user ID corresponding to the card ID and a period of time within which the time at which the card ID was received is included.

Subsequently, the transmission and reception unit 371 of the server apparatus 300 transmits, to the electronic whiteboard 200, a notification indicating a result of the search performed by the content management unit 373 (Step S1008). Hereinafter, the result of search is also referred to as a search result. In the example of FIG. 10, the content management information record is stored in the content management database 350.

When the transmission and reception unit 21 of the electronic whiteboard 200 receives the notification, the display control unit 24 displays, on the display 220, a notification screen notifying the presence of the content data to be displayed (Step S1009).

Subsequently, when the reception unit 22 of the electronic whiteboard 200 receives an instruction to display the content data to be displayed, the transmission and reception unit 21 transmits, to the server apparatus 300, a request for the content data to acquire the content data (Step S1010). Hereinafter, the request for content data is also referred to as an acquisition request or a content data acquisition request.

Upon receiving the acquisition request, the content management unit 373 of the server apparatus 300 reads the corresponding content data from the content management database 350 (Step S1011), and the transmission and reception unit 371 of the server apparatus 300 transmits the read content data (step S1012).

When the transmission and reception unit 21 of the electronic whiteboard 200 receives the content data, the display control unit 24 of the electronic whiteboard 200 displays, on the display 220, the received content data (Step S1013).

Figure 11A:
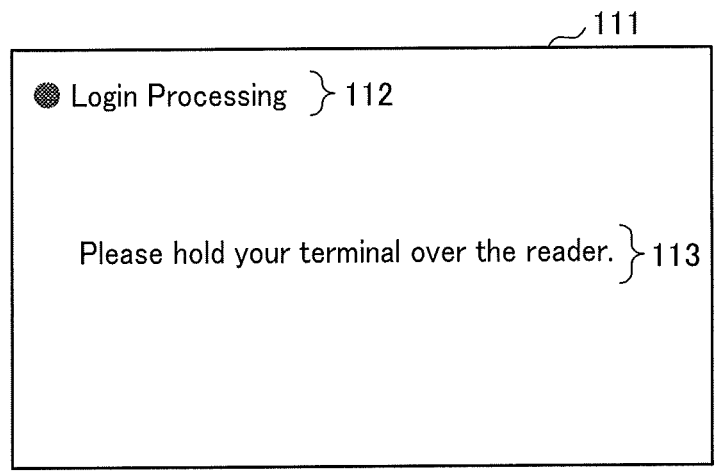
FIGS. 11A to 11C are illustrations of an example of login screens displayed on the electronic whiteboard according to the first embodiment of the present disclosure.
Figure 11B:
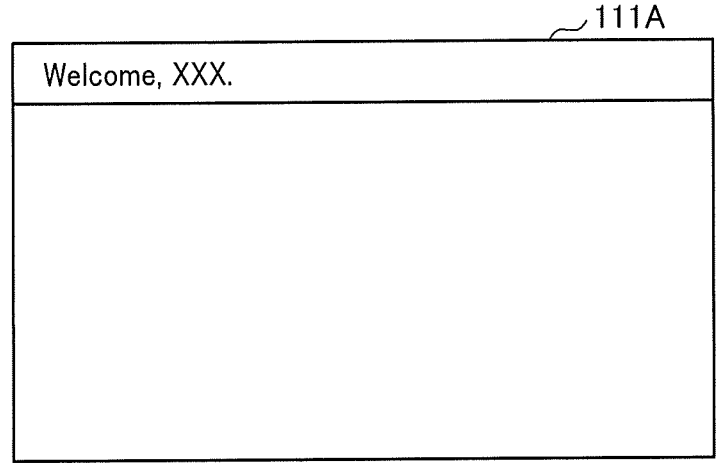
Figure 11C:
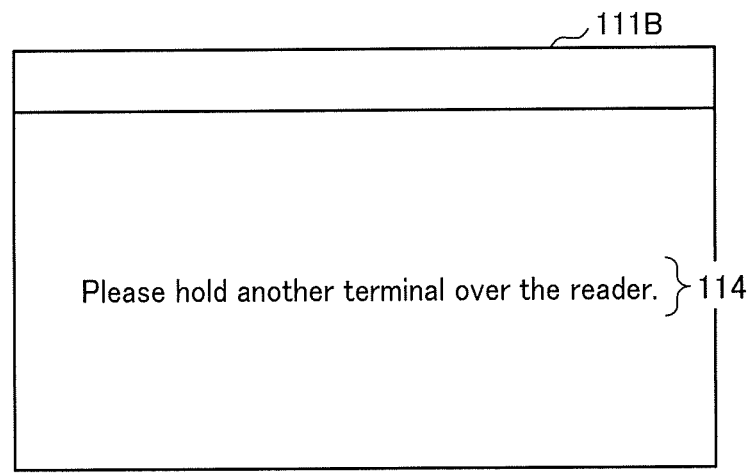

A description is now given of examples of login screens displayed on the electronic whiteboard 200 according to the present embodiment, with reference to FIG. 11A to FIG. 11C.

FIG. 11A to FIG. 11C are illustrations of examples of screens, which are related to logging in, displayed on the electronic whiteboard 200 according to the first embodiment of the present disclosure. FIG. 11A is an illustration of a screen 111, which is one example of the login screen, according to the present embodiment. FIG. 11B is an illustration of a screen 111A displayed after the authentication succeeds, according to the present embodiment. FIG. 11C is an illustration of a screen 111B displayed when the authentication fails, according to the present embodiment.

On the screen 111 illustrated in FIG. 11A, a message 112 indicating that login processing is required and a message 113 prompting the user to hold the privately-owned terminal over a reader are displayed. In the present embodiment, identification information is read from the privately-owned terminal in the user authentication, however, the embodiments are not intended to be limited to this. For example, in some embodiments, a user ID and a password may be input to the electronic whiteboard 200 to authenticate the user.

When the acquiring and providing unit 28 of the electronic whiteboard 200 acquires the identification information of the privately-owned terminal and the user authentication succeeds, the display control unit 24 causes the screen 111 to transition to the screen 111A illustrated in FIG. 11B. The screen 111A is a screen on which the user can input handwriting.

On the other hand, when the user authentication fails, the display control unit 24 causes the screen 111 to transition to the screen 111B illustrated in FIG. 11C. On the screen 111B, a message 114 indicating that the authentication has failed is displayed.

Figure 12:
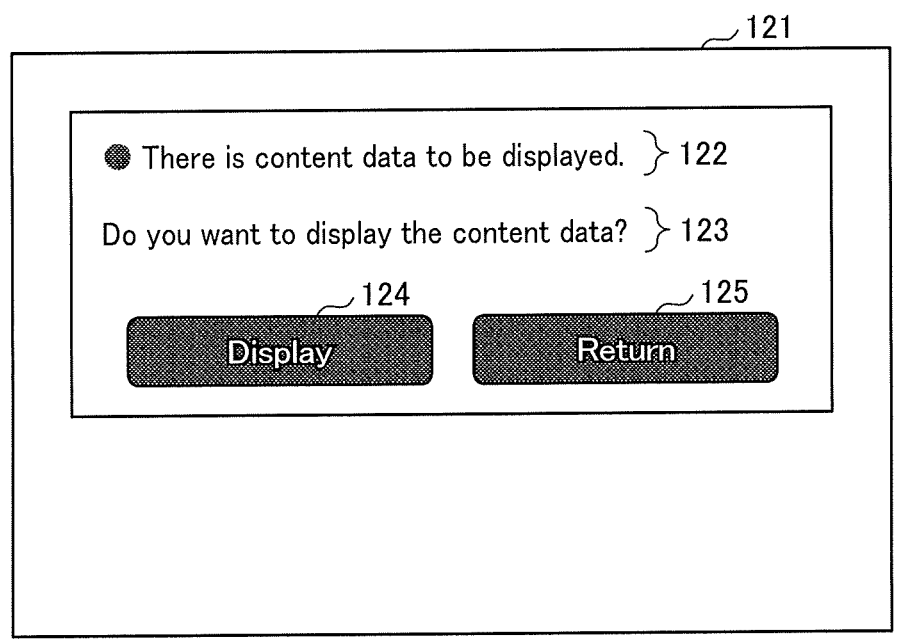
FIG. 12 is an illustration of an example of a notification screen displayed on the electronic whiteboard according to the first embodiment of the present disclosure.

A description is now given of an example of a notification screen for notifying a user of presence of content data to be displayed, with reference to FIG. 12.

FIG. 12 is an illustration of an example of a notification screen 121 displayed on the electronic whiteboard 200 according to the first embodiment. The notification screen 121 illustrated in FIG. 12 displays a message 122 for notifying the user of the presence of content data to be displayed for a period of time within which the time at which the user logged in is included and a message 123 for inquiring whether to display the content data or not.

In addition, on the notification screen 121, a button 124 for instructing to display the content data to be displayed and a button 125 for shifting the notification screen 121 to the previous screen are displayed.

In the present embodiment, when the button 124 is operated, the electronic whiteboard 200 transmits, to the server apparatus 300, an acquisition request to acquire content data to be displayed.

As described above, according to the present embodiment, the user can cause the electronic whiteboard 200 to display the content data desired by the user on the display 220 by holding the privately-owned terminal over the electronic whiteboard 200. Therefore, according to the present embodiment, it is not necessary for the user to perform a complicated operation of searching for the desired content to be displayed from a list of a large number of content data files after the user holds the privately-owned terminal over the electronic whiteboard 200.

In addition, the content data desired by the user to be displayed is stored in advance, by the user, in the content management database 350 as a content management information record. In storing the content data, for example, the content management information record may be generated using a computer connected to the server apparatus 300 and stored in the content management database 350.

In addition, regarding a content management information record, for example, content data generated when a user previously used the electronic whiteboard 200 or another electronic whiteboard may be transmitted to the server apparatus 300, and the content management unit 373 may store the received content data in the content management database 350 as a content management information record.

As described above, the electronic whiteboard 200 according to the first embodiment displays data desired by the user easily.

Second Embodiment

A second embodiment of the present disclosure is described below with reference to attached drawings. The second embodiment is different from the first embodiment in that an electronic whiteboard is used to make a meeting room reservation. In the following description of the second embodiment, the difference from the first embodiment is focused. In the following description, the same reference numerals are given to the same or corresponding functions or configurations as those of the first embodiment, and the redundant descriptions are omitted or simplified appropriately.

Figure 13:
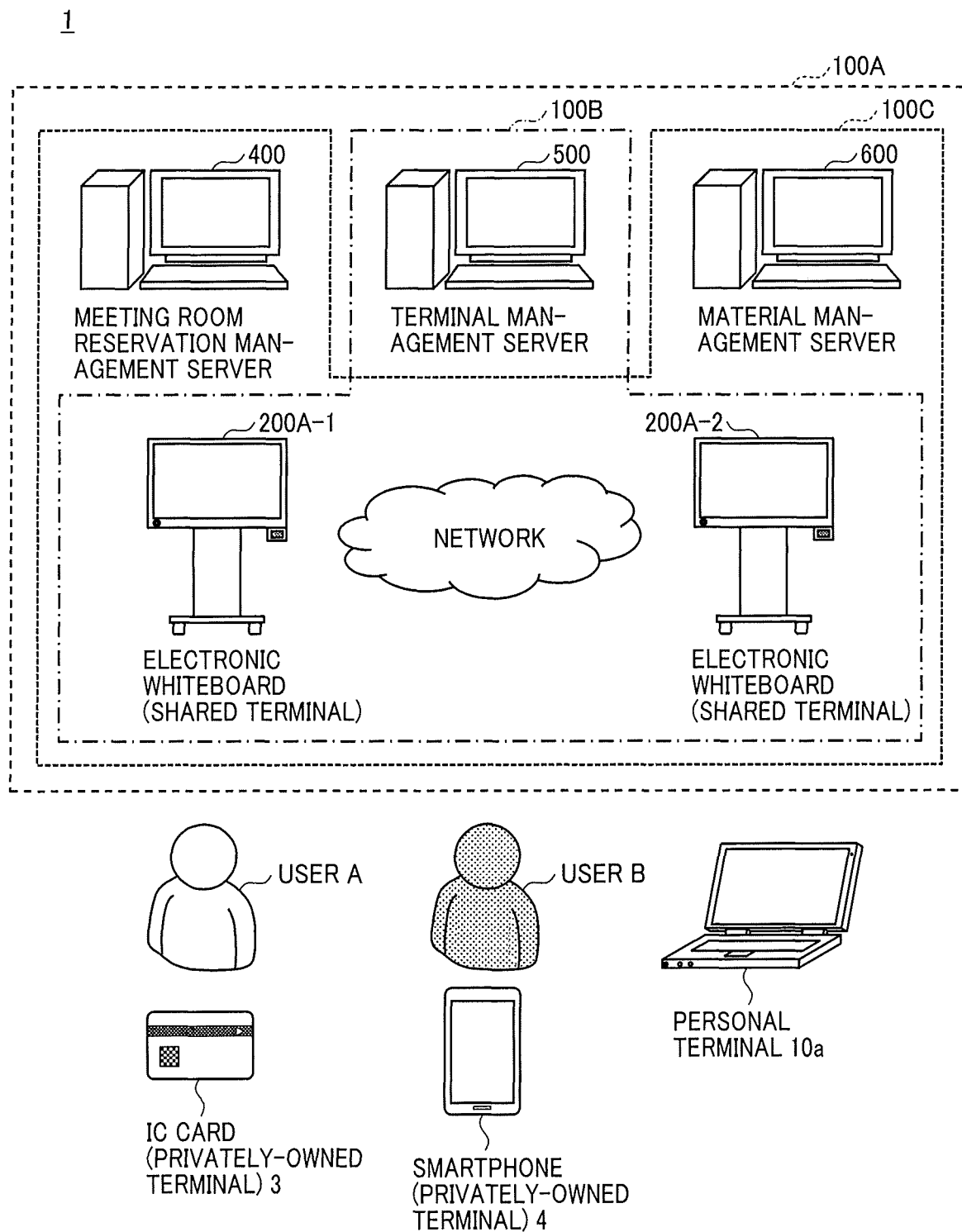
FIG. 13 is a diagram illustrating an example of a system configuration of an electronic whiteboard system according to a second embodiment of the present disclosure.

FIG. 13 is a diagram illustrating an example of a system configuration of an electronic whiteboard system 100A according to the second embodiment of the present disclosure. The electronic whiteboard system 100A according to the present embodiment includes electronic whiteboards 200A-1 and 200A-2, a meeting room reservation management server 400, a terminal management server 500, and a material management server 600.

In the example of FIG. 13, the number of the electronic whiteboards 200A included in the electronic whiteboard system 100A is two, the electronic whiteboard 200A-1 and the electronic whiteboard 200A-2, however, the embodiments are not intended to be limited to this. The number of electronic whiteboards 200A included in the electronic whiteboard system 100A may be any number. In the following description, the electronic whiteboards 200A-1 and 200A-2 are referred to as the electronic whiteboard 200A or the electronic whiteboards 200A when not being necessary to be distinguished from each other.

The electronic whiteboard system 100A according to the present embodiment is used in, for example, a company having a plurality of meeting rooms in each of which the electronic whiteboard 200A is installed. In the present embodiment, it is assumed that a meeting conducted in a meeting room where the electronic whiteboard 200A-1 is installed is prolonged and the user of the meeting moves from the meeting room to another meeting room in which the electronic whiteboard 200A-2 is installed to continue the meeting, because a period of time for room reservation is over.

In the embodiment, in such a case, when the privately-owned terminal of the user who participates in the meeting is held over the electronic whiteboard 200A-2 installed in the meeting room in which the user moves to, content data previously displayed on the electronic whiteboard 200A-1 (first electronic whiteboard) is displayed on the electronic whiteboard 200A-2 (second electronic whiteboard).

The meeting room reservation management server 400 (third information processing system) according to the present embodiment manages information related to meeting room reservations for each user. The terminal management server 500 (second information processing system) according to the present embodiment manages a privately-owned terminal and a user ID of a user in association with each other. In other words, the terminal management server 500 has the user database 360, which includes user management information.

The material management server 600 (first information processing system) manages content data to be displayed on the electronic whiteboard 200A. In other words, the material management server 600 has a database corresponding to the content management database 350.

In the electronic whiteboard system 100A according to the present embodiment, a personal terminal 10a that is connected to the electronic whiteboard system 100A through a network is used to make a meeting room reservation, for example. In addition, the personal terminal 10a may generate content data to be managed by the material management server 600.

In other words, the electronic whiteboard system 100A according to the present embodiment can be said as a system that includes an electronic whiteboard system 100B including the electronic whiteboard 200A and the terminal management server 500 and a meeting management system 100C including the electronic whiteboard 200A, the meeting room reservation management server 400, and the material management server 600.

In addition, each of the meeting room reservation management server 400, the terminal management server 500, the material management server 600, and the personal terminal 10a is a general-purpose computer, and the corresponding hardware configuration is the same as that of the server apparatus 300 according to the first embodiment, and the redundant description of the hardware configuration is omitted here.

As described above, a plurality of servers may be included in the system, and any of the plurality of servers may have each function. In addition, the system configuration in which a terminal and a server are connected to each other is just an example. There are other various system configurations that are different from each other depending on an application or a purpose.

Figure 14:
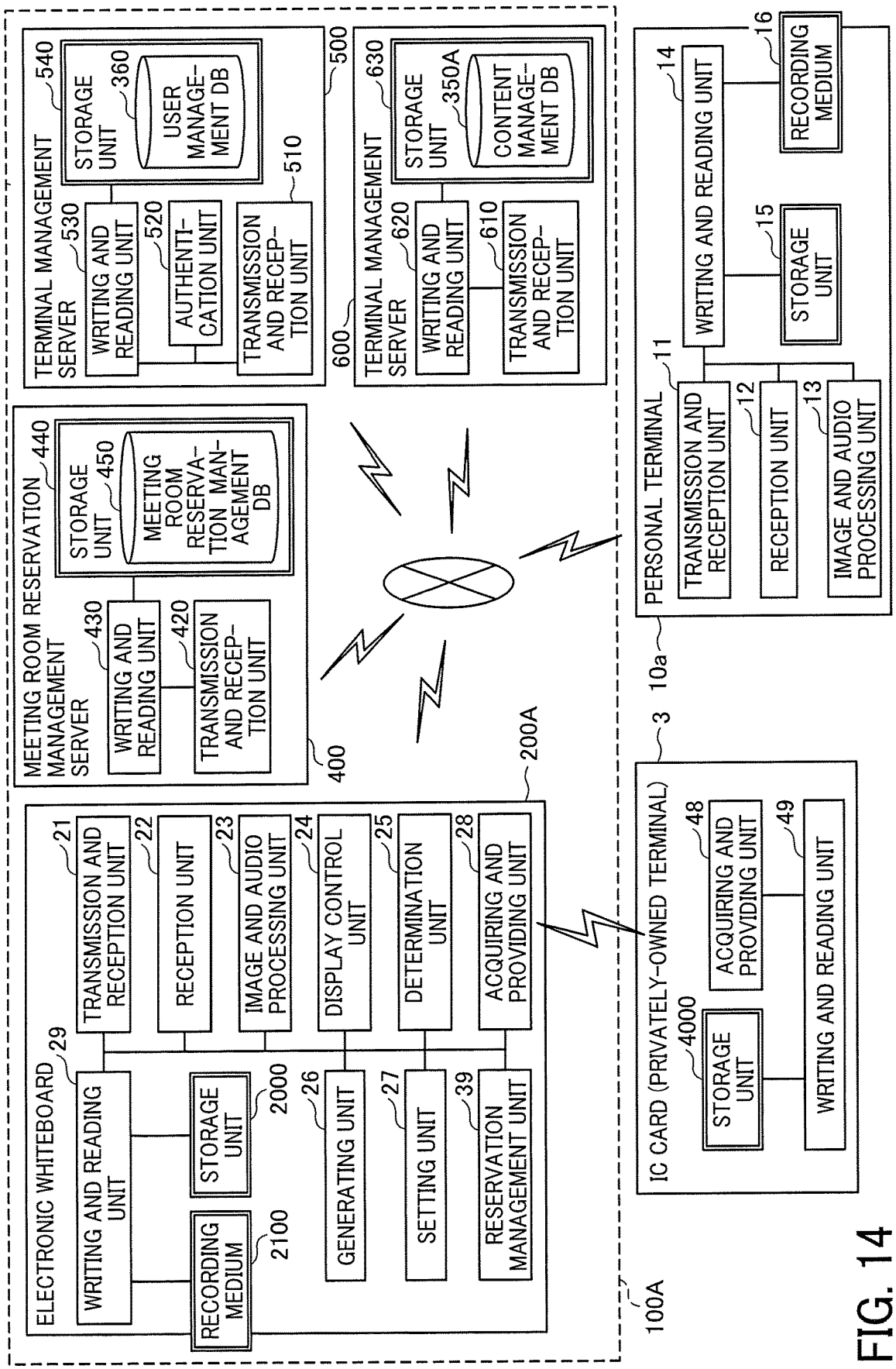
FIG. 14 is a block diagram illustrating functions of each devices included in the electronic whiteboard system according to the second embodiment of the present disclosure.

A description is now given of functions of each devices included in the electronic whiteboard system 100A according to the present embodiment, with reference to FIG. 14.

FIG. 14 is a block diagram illustrating the functions of each devices included in the electronic whiteboard system 100A according to the second embodiment of the present disclosure.

A description is now given of functions of the electronic whiteboard 200A according to the present embodiment. The electronic whiteboard 200A includes the transmission and reception unit 21, the reception unit 22, the image and audio processing unit 23, the display control unit 24, the determination unit 25, the generating unit 26, the setting unit 27, the acquiring and providing unit 28, and a reservation management unit 39.

The reservation management unit 39 according to the present embodiment manages the meeting room reservation related a meeting room in which the own device (electronic whiteboard 200A) is installed.

More specifically, upon acquiring identification information from a privately-owned terminal held over the electronic whiteboard 200A by a user, the reservation management unit 39 causes the transmission and reception unit 21 to transmit, to the meeting room reservation management server 400, a notification indicating that the own device (electronic whiteboard 200A) is started to be used. That is, the electronic whiteboard 200A transmits, to the meeting room reservation management server 400, a notification indicating that a meeting conducted in the meeting room in which the own device (electronic whiteboard 200A) is installed has been started to notify that the user starts using the own device (electronic whiteboard 200A).

Further, the reservation management unit 39 determines whether a current time is a predetermined time before the end time of the meeting room reservation, which is related to the meeting room in which the own device (electronic whiteboard 200A) is installed, or not, and when the current time is the predetermined time before the end time, the display control unit 24 may display, on the display 220, a message indicating the predetermined time has come. For example, the predetermined time may be set by a user or a designer. For example, the predetermined time may be set to ten minutes.

In addition, the reservation management unit 39 may transmit, to the meeting room reservation management server 400, a notification indicating that the meeting conducted in the meeting room in which the own device (electronic whiteboard 200A) is installed is over, to notify that the user finishes using the own device (electronic whiteboard 200A).

In addition, the reservation management unit 39 can make a meeting room reservation. More specifically, for example, when the meeting is prolonged, and the meeting room reservation is required to be extended, or the user moves to another available meeting room to continuously conduct the meeting, the reservation management unit 39 make the meeting room reservation. In other words, upon receiving the information on the meeting room reservation, the reservation management unit 39 associates the information with a user ID of the user who is currently logs in and transmits the information being associated with the user ID to the meeting room reservation management server 400.

The meeting room reservation management server 400 according to the present embodiment includes a transmission and reception unit 420, a writing and reading unit 430, and a storage unit 440. Each of the above-mentioned functional units is implemented by the CPU 301 executing a meeting room reservation management program read from the HD 304 and developed on the RAM 303 in the meeting room reservation management server 400.

The transmission and reception unit 420 transmits or receives data (information) to or from each of the other devices included in the electronic whiteboard system 100A through a network. The writing and reading unit 430 stores various types of data in the storage unit 440 or reads various types of data stored in the storage unit 440.

More specifically, when a notification indicating that a meeting has started or that a meeting has ended is received from the electronic whiteboard 200A, the writing and reading unit 430 updates a meeting room reservation management database 450 based on the notification, for example.

In the storage unit 440, the meeting room reservation management database 450 is stored. The meeting room reservation management database 450 is implemented by a storage device such as the HD 304. The meeting room reservation management database 450 stores information on meeting room reservations. A detailed description of the meeting room reservation management database 450 is deferred.

The terminal management server 500 includes a transmission and reception unit 510, a writing and reading unit 520, and a storage unit 530. Each of the above-mentioned functional units is implemented by the CPU 301 executing a terminal management program read from the HD 304 and developed on the RAM 303 in the terminal management server 500.

The transmission and reception unit 510 transmits or receives data (information) to or from each of the other devices included in the electronic whiteboard system 100A through a network. The writing and reading unit 520 stores various types of data in the storage unit 530 or reads various types of data stored in the storage unit 530. In the storage unit 530, the user database 360 is stored.

The material management server 600 according to the present embodiment includes a transmission and reception unit 610, a writing and reading unit 620, and a storage unit 630. Each of the above-mentioned functional units is implemented by the CPU 301 executing a material management program read from the HD 304 and developed on the RAM 303 in the material management server 600.

The transmission and reception unit 610 transmits or receives data (information) to or from each of the other devices included in the electronic whiteboard system 100A through a network. The writing and reading unit 620 stores various types of data in the storage unit 630 or reads various types of data stored in the storage unit 630.

In the storage unit 630, a content management database 350A is stored. A detailed description of the content management database 350A is deferred.

A description is now given of functions of the personal terminal 10a according to the present embodiment. The personal terminal 10a includes a transmission and reception unit 11, a reception unit 12, a display control unit 13, a writing and reading unit 14, and a storage unit 15.

The transmission and reception unit 11 transmits or receives data (information) to or from each of the other devices included in the electronic whiteboard system 100A through a network. The reception unit 12 receives inputs of various types of information to the personal terminal 10a.

The display control unit 13 controls display of the display of the personal terminal 10a. The writing and reading unit 14 stores various types of data in the storage unit 15 or reads various types of data stored in the storage unit 15 or the recording medium 16.

In the present embodiment, the personal terminal 10a may be used to make a meeting room reservation, for example. More specifically, the personal terminal 10a causes the display control unit 13 to display, on the display, a reservation screen for making a meeting room reservation, and the reception unit 12 receives an input of selecting a meeting room and a period of time to use the meeting room (reservation time), for example. Then, the transmission and reception unit 11 of the personal terminal 10a may transmit the input information to the meeting room reservation management server 400.

Figure 15A:
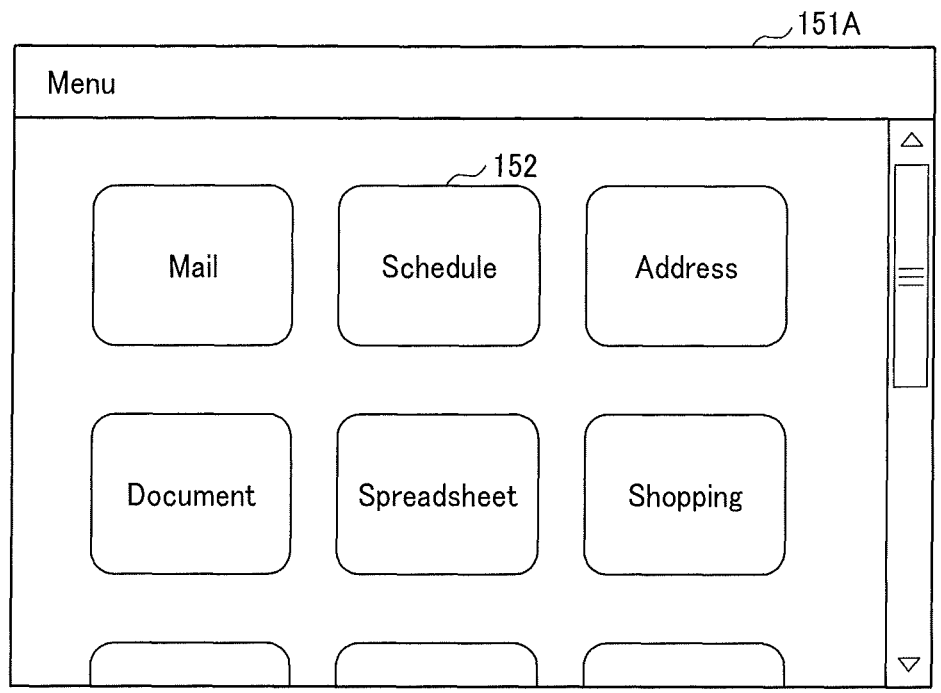
FIG. 15A and FIG. 15B are illustrations of screens of a personal terminal for making a meeting room reservation, according to an embodiment of the present disclosure.
Figure 15B:
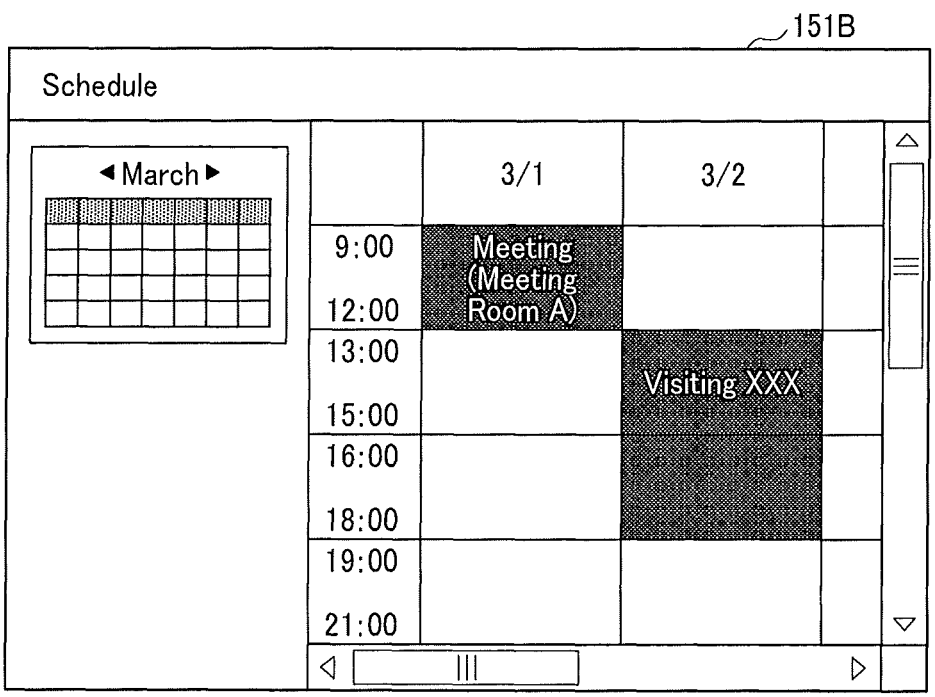

A description is now given of making a meeting room reservation by using the personal terminal 10a, with reference to FIG. 15. FIG. 15A and FIG. 15B are illustrations of screens of the personal terminal 10a for making a meeting room reservation, according to the present embodiment. FIG. 15A is an illustration of a menu screen 151A displayed on the personal terminal 10a, according to the present embodiment. FIG. 15B is an illustration of a screen 151B of a schedule table displayed on the personal terminal 10a according to the present embodiment.

The personal terminal 10a according to the present embodiment is, for example, a terminal used by each user. The menu screen 151A illustrated in FIG. 15 displays a list of icons. Some of the icons included in the list correspond to services that the user of the personal terminal 10a can use via the personal terminal 10a, and some of the icons included in the list correspond to applications executable on the personal terminal 10a.

When an icon 152 corresponding to a schedule table is selected on the menu screen 151A, the personal terminal 10a causes the menu screen 151A to transition to the screen 151B.

On the screen 151B, the user can set a schedule of the user of the personal terminal 10a and confirm and change the set schedule.

In the present embodiment, when an available meeting room is selected on the screen 151B and a period of time to use the meeting room is input, the selected meeting room and the period of time to use the meeting room are transmitted to the meeting room reservation management server 400 along with the user ID of the user of the personal terminal 10a, for example.

When receiving the information including the selected meeting room, the period of time, and the user ID from the personal terminal 10a, the meeting room reservation management server 400 stores the information in the meeting room reservation management database 450, which includes meeting reservation management information.

A description is now given of the meeting room reservation management database 450 of the meeting room reservation management server 400, with reference to FIG. 16A and FIG. 16B.

FIG. 16A and FIG. 16B are conceptual diagram illustrating examples of the meeting room reservation management database 450 according to the second embodiment of the present disclosure. FIG. 16A is the conceptual diagram illustrating a meeting room reservation management database 450-1 stored when a plurality of meeting rooms is reserved. FIG. 16B is the conceptual diagram illustrating a meeting room reservation management database 450-2 stored when some meeting rooms of the plurality of meeting rooms is in use.

The meeting room reservation management database 450 according to the present embodiment includes reservation management information records each of which has items of information, "Date of Use", "Floor Number", "Meeting Room Name", "Start Time", "End Time", "User ID", and "Status".

A value of the item of "Date of Use" indicates a date of using a meeting room. A value of the item of "Floor Number" indicates a floor level of a meeting room in the building. A value of the item of "Meeting Room Name" indicates a name of a meeting room. In the meeting room reservation management database 450, information including each value of the corresponding item is referred to as a reservation management information record. That is, the meeting room reservation management database 450 records reservation management information records each of which indicates information on each meeting room reservation.

A value of the item of "Start Time" indicates a time to start a meeting in a corresponding meeting room. Namely, the value of the item of "Start Time" indicates a scheduled time to start using the meeting room. A value of the item of "End Time" indicates a time to end using the meeting room. A value of the item of "Status" indicates a status of the meeting room reservation. When the value of the item of "Status" is "Reserved", a corresponding meeting room is reserved and to be used. This also indicates the meeting room is not used yet. When the value of the item of "Status" is "In Use", the corresponding meeting room is in use.

Referring to FIG. 16A, the meeting room reservation management database 450-1 indicates that a meeting room A is reserved from 9:30 to 10:30 on a date of 2018 Jan. 30 by a user identified by a user ID of "123456" and the meeting is not started yet in the meeting room A.

Referring to FIG. 16B, the meeting room reservation management database 450-2 indicates that a start time of using the meeting room A on the date of 2018 Jan. 30 is 9:32, and a status of the meeting room A indicates that the room is being used. Accordingly, in the example of FIG. 16B, the user identified by the user ID of "123456" has held his or her privately-owned terminal over the electronic whiteboard 200A installed in the meeting room A at 9:32 to start using the meeting room A.

A description is now given of the content management database 350A of the material management server 600 according to the present embodiment, with reference to FIG. 17. FIG. 17 is a conceptual diagram illustrating the content management database 350A according to the second embodiment of the present disclosure.

A content management information record stored in the content management database 350A according to the present embodiment is generated when a meeting room reservation is made by using the electronic whiteboard 200A.

The content management database 350A according to the present embodiment has items of information of "User ID", "Content Data", "Destination Meeting Room Name", and a "Reservation Time".

A value of the item of "User ID" indicates a user ID corresponding to identification information read from a privately-owned terminal by the electronic whiteboard 200A. A value of the item of "Content Data" indicates content data previously displayed on any one of the electronic whiteboards 200A included in the electronic whiteboard system 100A.

A value of the item of "Destination Meeting Room Name" indicates a name of a meeting room to which the user moves. In a case where a scheduled meeting is prolonged, and a meeting room, which has been used, is available after a scheduled end time, the value of "Destination Meeting Room Name" may indicate the name of the meeting room, which has been used.

In addition, the content management database 350A may have an item of "Terminal ID" instead of the item of "Destination Meeting Room Name". The value of the item of "Terminal ID" is identification information unique to each of the electronic whiteboards 200A for identifying each of the electronic whiteboards 200A. The value of the item of "Reservation Time" indicates a period of time to use a corresponding reserved meeting room to which the user moves. In other words, the value of the item of "Reservation Time" indicates a period of time during which the electronic whiteboard 200A is scheduled to be used in a meeting room, which is a moving destination. In other words, the value of the item of "Reservation Time" is a period of time for which a corresponding content data is displayed on the electronic whiteboard 200A installed in a meeting room, which is a moving destination.

In addition, the content management database 350A according to the present embodiment may store a content management information record registered in advance by using the personal terminal 10a in making a meeting room reservation, for example. In addition, the meeting room reservation management server 400 may have the content management database 350 storing, by using, for example, the personal terminal 10a, content management information records, each of which is registered during a period of time from a time at which a meeting room is reserved by using the personal terminal 10a to a time at which the corresponding meeting starts.

A description is now given of operation of the electronic whiteboard system 100A, with reference to FIG. 18A, FIG. 18B, FIG. 19A, FIG. 19B, and FIG. 19C.

In the following description with reference to FIG. 18A and FIG. 18B, the operation is performed in a case where a meeting is prolonged, and a meeting room, which has been used for the meeting, is to be continuously used after an end time of the reservation time. In the following description with reference to FIG. 19A to FIG. 19C, the operation is performed in a case where a meeting is prolonged, and the user moves from a meeting room, which has been used for the meeting, to another meeting room to continue the meeting using the electronic whiteboard 200A that is installed in the meeting room to which the user of the meeting moves.

Figure 18B:
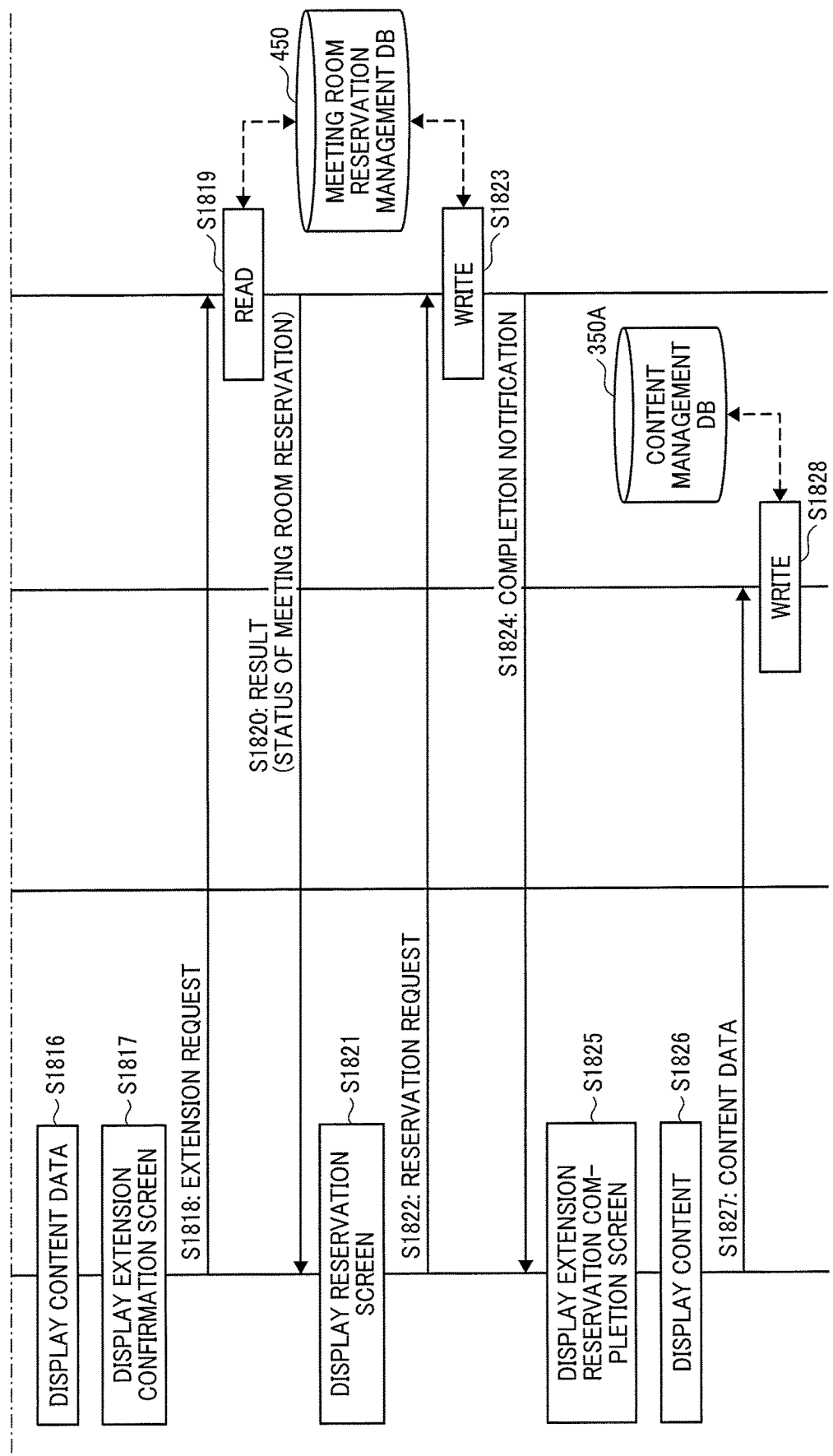

FIG. 18A and FIG. 18B is a sequence diagram illustrating a process performed by the electronic whiteboard system 100A according to the second embodiment of the present disclosure. The process illustrated in FIG. 18A and FIG. 18B is performed in the case where a meeting conducted in a meeting room in which the electronic whiteboard 200A-1 is installed, is prolonged, and the meeting is to be continuously conducted in the same meeting room.

Processing of S1801 to S1806 performed by the electronic whiteboard 200A-1 and the terminal management server 500 illustrated in FIG. 18A is substantially the same as the processing of S1001 to S1006 performed by the electronic whiteboard 200 and the server apparatus 300 illustrated in FIG. 10, and the description of the processing of S1801 to S1806 illustrated in FIG. 18A is omitted here.

Subsequent to S1806, the reservation management unit 39 of the electronic whiteboard 200A-1 causes the transmission and reception unit 21 to transmit, to the meeting room reservation management server 400, a use start notification indicating that the use of the own device (electronic whiteboard 200A-1) has been started (Step S1807). The use start notification may include the user ID acquired in the authentication performed by the electronic whiteboard 200A and information on a time at which a card ID is acquired.

In response to the notification, the writing and reading unit 430 of the meeting room reservation management server 400 refers the meeting room reservation management database 450 to identify a reservation management information record that includes both of a user ID identical to the user ID included in the use start notification and a reservation time, which is from a start time to an end time, including the time indicated by the use start notification. Then, the writing and reading unit 430 writes the time at which the card ID is acquired as a value of the item of "Start Time", and "In Use" as a value of the item of "Status" included in the identified reservation management information record (Step S1808).

In addition, the reservation management unit 39 of the electronic whiteboard 200A-1 causes the transmission and reception unit 21 to transmit a search request, to the material management server 600, to search content data (Step S1809). The search request includes the user ID included in the use start notification and the information on the time at which the card ID is acquired.

In response to the notification, the writing and reading unit 620 of the material management server 600 searches the content management database 350A (Step S1810) and notifies the electronic whiteboard 200A-1 of a result of the search (Step S1811). Hereinafter, the result of the search is also referred to as a search result or a determination result.

More specifically, the material management server 600 determines whether there is content management information record that includes both of a user ID identical to the user ID included in the notification and a reservation time within which the time at which the card ID is acquired is included, in the content management database 350A. Then the material management server 600 transmits a notification of the determination result to the electronic whiteboard 200A-1. In the example of FIG. 18A, the notification transmitted in S1811 indicates that a corresponding content management information record is stored in the content management database 350A.

Upon receiving the notification (determination result), the display control unit 24 of the electronic whiteboard 200A-1 displays, on the display 220, a screen notifying that content data to be displayed is present (Step S1812).

When an operation of instructing to display the content data is performed on the screen, the transmission and reception unit 21 of the electronic whiteboard 200A-1 transmits an acquisition request to acquire content data, to the material management server 600 (Step S1813).

In response to the acquisition request, the material management server 600 reads, from the content management database 350A, the content data included in the content management information record searched in S1810 (Step S1814). Then, the material management server 600 transmits the read content data to the electronic whiteboard 200A-1 (Step S1815).

The display control unit 24 of the electronic whiteboard 200A-1 displays, on the display 220, the content data received from the material management server 600 (Step S1816).

When the end time of the meeting room reservation is approaching, the reservation management unit 39 of the electronic whiteboard 200A-1 causes the display control unit 24 to display, on the display 220, an extension confirmation screen to inquire whether to extend the reservation time or not (Step S1817).

Upon receiving operation of instructing to extend the room reservation on the extension confirmation screen, the transmission and reception unit 21 of the electronic whiteboard 200A-1 transmits a request to extend the reservation time to the meeting room reservation management server 400 (Step S1818). Hereinafter, the request to extend a room reservation is also referred to as an extension request.

Upon receiving the extension request, the meeting room reservation management server 400 refers to the meeting room reservation management database 450 and reads a reservation management record with which the meeting room, in which the electronic whiteboard 200A-1 is installed, is associated (Step S1819). Then, the meeting room reservation management server 400 transmits, to the electronic whiteboard 200A-1, information on a reservation status of the meeting room in which the electronic whiteboard 200A-1 is installed (Step S1820).

Upon receiving the information on the reservation status that indicates that the meeting room is available, the display 220 of the electronic whiteboard 200A-1 displays a reservation screen for making a meeting room reservation (Step S1821) Upon receiving an operation of instructing to make a meeting room reservation on the reservation screen, the transmission and reception unit 21 of the electronic whiteboard 200A-1 transmits a request to make a meeting room reservation to the meeting room reservation management server 400 (Step S1822). Hereinafter, the request to make a meeting room reservation is also referred to as a reservation request.

In response to the reservation request, the meeting room reservation management server 400 newly generates a reservation management information record including the user ID and the meeting room name and then writes the reservation management information record in the meeting room reservation management database 450 (Step S1823) In the reservation management information record generated at this time, the reservation time, which is from a start time to an end time, may be a predetermined period of time. In other words, when the meeting room reservation is to be extended, the time available for the extension may be determined in advance.

Upon completion of the writing the reservation management information record, the meeting room reservation management server 400 transmits, to the electronic whiteboard 200A-1, a completion notification indicating that the meeting room reservation is completed (Step S1824).

Upon receiving the completion notification, the electronic whiteboard 200A-1 displays, on the display 220, an extension reservation completion screen indicating that the extension of the meeting room reservation has been completed (Step S1825).

Subsequently, the electronic whiteboard 200A-1 receives an operation of instructing to store the content data (Step S1826). Subsequently, the electronic whiteboard 200A-1 transmits the content data to the material management server 600 (Step S1827). Along with the content data, the electronic whiteboard 200A-1 transmits, to the material management server 600, the user ID acquired as the authentication result and the extension time of the meeting room reservation, both of which are associated with the content data.

The content data transmitted to the material management server 600 includes stroke images that are handwriting inputs made during a period of time from the time at which the card ID is acquired by the electronic whiteboard 200A-1 to the time at which the operation of instructing to store the content data is received by the electronic whiteboard 200A-1.

Upon receiving the content data, the material management server 600 writes the user ID, the meeting room name, and the extended time of meeting room reservation (reservation time) in the content management database 350A in association with the content data (Step S1828).

That is, the user of the electronic whiteboard 200A-1 checks whether the current meeting room is to be continuously available or not, and when the meeting room is to be continuously available, the user extends the reservation time of the meeting room reservation.

In the example of FIG. 18A and FIG. 18B, the content data that has been used in the meeting can be displayed on the electronic whiteboard 200A-1 smoothly, by acquiring, again, the card ID identical to the card ID acquired in S1802, after the end time included in the reservation management information record.

Figure 19B:
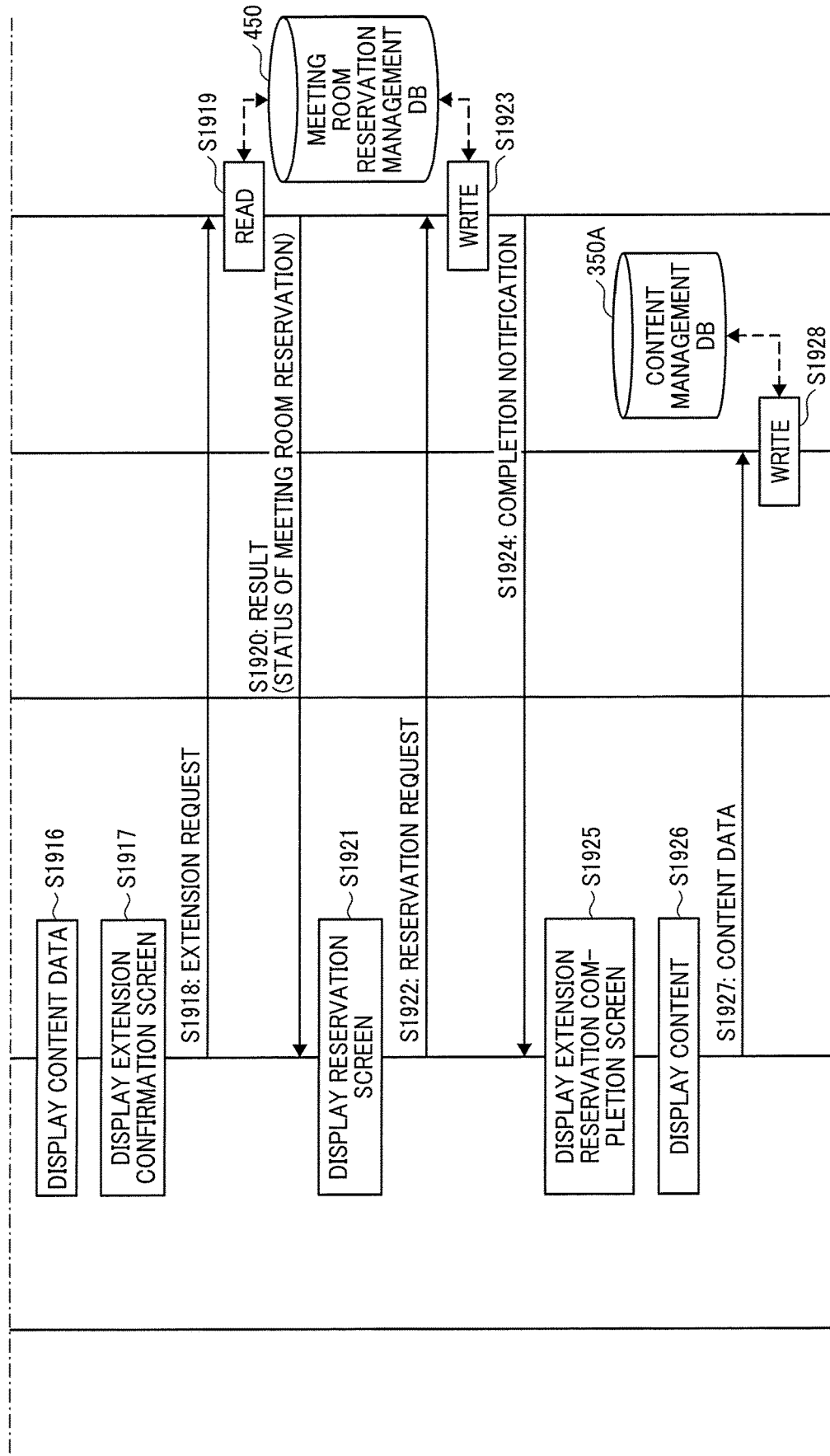
Figure 19C:
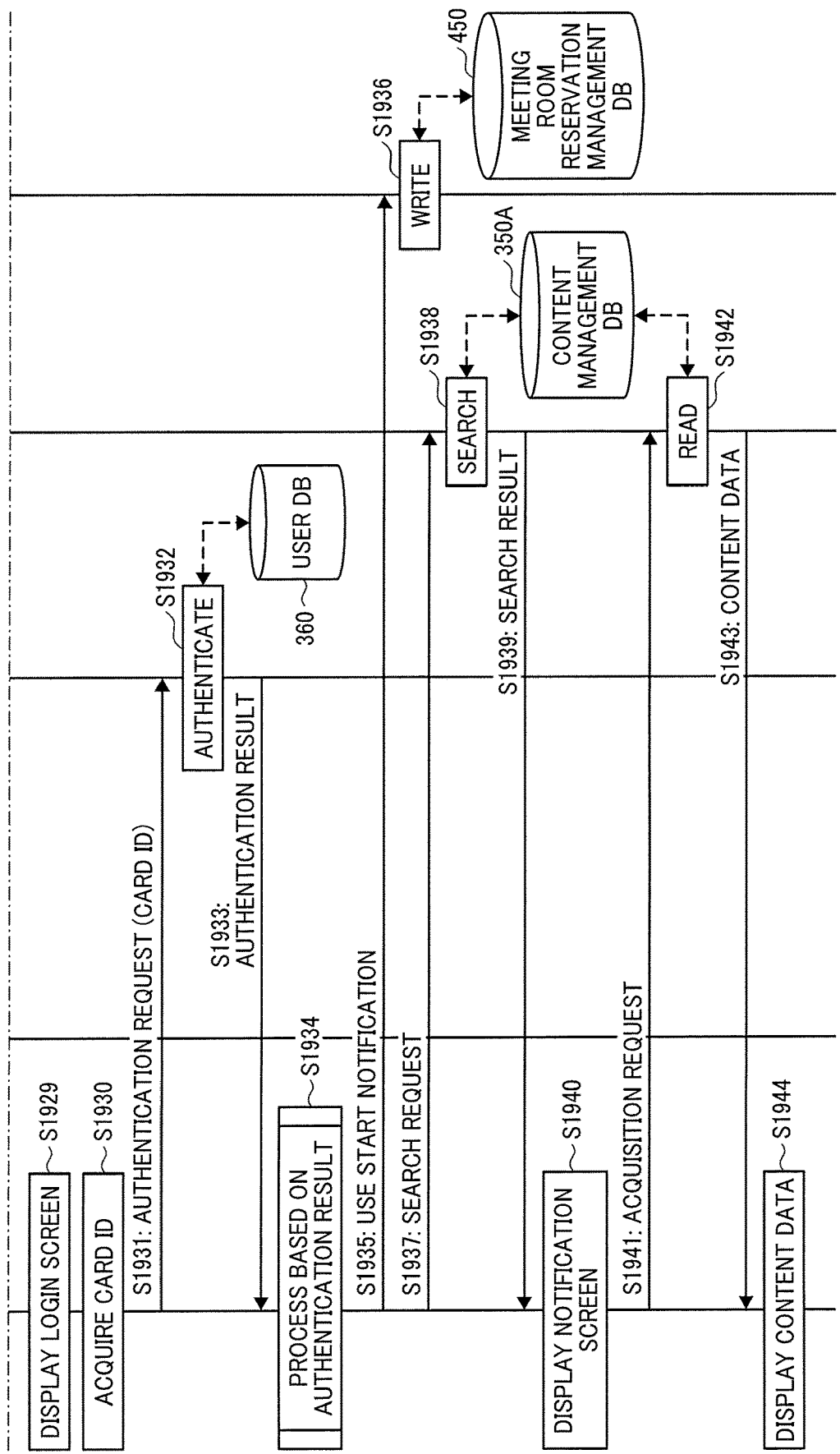

FIG. 19A to FIG. 19C are a sequence diagram illustrating a process performed by the electronic whiteboard system 100A according to the second embodiment of the present disclosure.

The process illustrated in FIG. 19A to FIG. 19C is performed in the case where the meeting conducted in a meeting room in which the electronic whiteboard 200A-1 is installed, is extended, and the extended meeting is continuously conducted in another meeting room in which the electronic whiteboard 200A-2 is installed by using the electronic whiteboard 200A-2.

Processing of S1901 to S1928 illustrated in FIG. 19A and FIG. 19B is substantially the same as the processing of S1801 to S1828 illustrated in FIG. 18A and FIG. 18B, and the description of the processing of S1901 to S1928 illustrated in FIG. 19A and FIG. 19B is omitted here.

Subsequent to S1928, the electronic whiteboard 200A-2 displays a login screen (Step S1929). Subsequently, the electronic whiteboard 200A-2 acquires the card ID from the IC card 3 held over the electronic whiteboard 200A-2 by the user (Step S1930). The card ID acquired in S1930 is the same as the card ID acquired by the electronic whiteboard 200A-1 in S1902.

Processing of S1931 to S1944 is substantially the same as the processing of S1903 to S1916, and the description of the processing of S1903 to S1916 is omitted here.

A description is now given of a process performed by the electronic whiteboard 200A. The process is performed after the authentication of the user succeeds and the content data is displayed and before the extension reservation screen for making a meeting room reservation is displayed.

Figure 20:
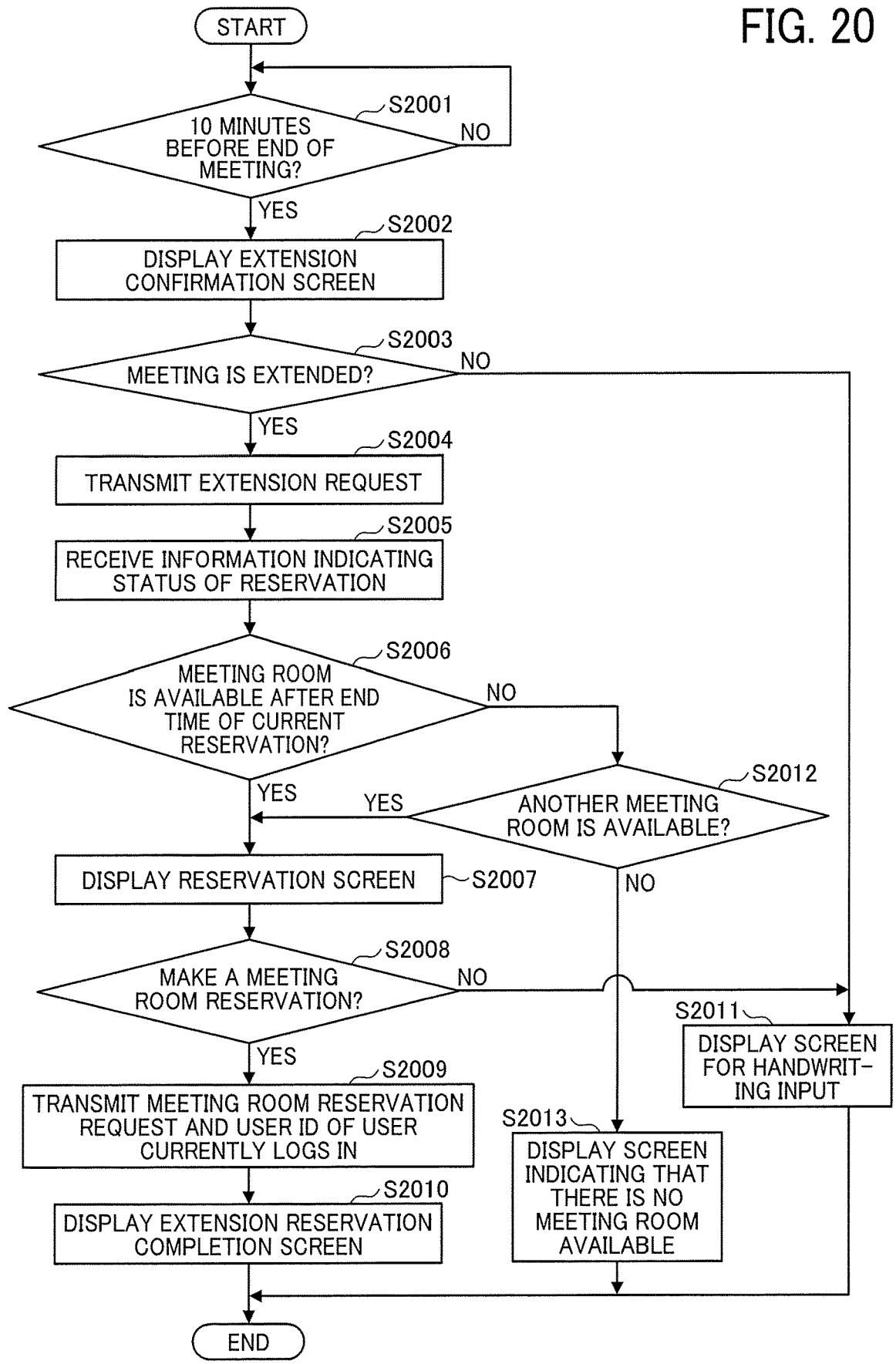
FIG. 20 is a flowchart illustrating an example of a process performed by the electronic whiteboard according to the second embodiment of the present disclosure.

FIG. 20 is a flowchart illustrating an example of the process performed by the electronic whiteboard 200A according to the second embodiment of the present disclosure. The process illustrated in FIG. 20 corresponds to the operation of the electronic whiteboard 200A-1 in the processing of S1816 to S1825 illustrated in FIG. 18B and the operation of the electronic whiteboard 200A-2 in the processing of S1919 to S1925 illustrated in FIG. 19B.

The reservation management unit 39 of the electronic whiteboard 200A according to the present embodiment determines whether a current time is ten minutes before the end time included in the reservation management information record corresponding to the current meeting by accessing the meeting room reservation management server 400 (Step S2001). Here, the ten minutes described above is an example of the predetermined time that is set in advance.

More specifically, the electronic whiteboard 200A may acquire the reservation management information record in which the start time is written, from the meeting room reservation management server 400, and may check the current time and the end time. In addition, the electronic whiteboard 200A may periodically access the meeting room reservation management server 400 and check the current time and the end time by referring to the reservation management information record in which the start time is written.

In S2001, when the current time is not yet ten minutes before the end time, the electronic whiteboard 200A waits until the time comes. In S2001, when the current time is ten minutes before the end time, the electronic whiteboard 200A displays an extension confirmation screen (Step S2002). Subsequently, the electronic whiteboard 200A determines whether an operation of instructing to extend the meeting is received or not (Step S2003).

In S2003, when the operation of instructing to extend the meeting is not received, the process performed by the electronic whiteboard 200A proceeds to Step S2011, which is described later.

Upon receiving the operation of instructing to extend the meeting in S2003, the electronic whiteboard 200A transmits an extension request to the meeting room reservation management server 400 (Step S2004).

Subsequently, the electronic whiteboard 200A receives, from the meeting room reservation management server 400, information on the reservation status of the meeting room in which the own device (electronic whiteboard 200A) is installed (Step S2005).

Subsequently, the reservation management unit 39 of the electronic whiteboard 200A determines whether the meeting room in which the own device (electronic whiteboard 200A) is installed is available after the end time based on the information on the reservation status (Step S2006). In S2006, when the meeting room in which the own device (electronic whiteboard 200A) is installed is not available, the process performed by the electronic whiteboard 200A proceeds to S2012, which is described later.

In S2006, when the meeting room in which the own device (electronic whiteboard 200A) is installed is available, the electronic whiteboard 200A displays a reservation screen (Step S2007) and determines whether an operation of instructing to make a meeting room reservation is received or not (Step S2008). In S2008, when the operation of instructing to make a meeting room reservation is not performed, the process performed by the electronic whiteboard 200A proceeds to S2011, which is described later.

Upon receiving the operation of instructing to make a meeting room reservation in S2008, the electronic whiteboard 200A transmits, to the meeting room reservation management server 400, a reservation request along with the user ID acquired in the authentication (Step S2009). Subsequently, the electronic whiteboard 200A receives a notification of completion (completion notification) of the reservation from the meeting room reservation management server 400 and displays an extension reservation completion screen (Step S2010), and the process of extending the meeting room reservation is completed.

In S2003, when the operation of instructing to make a meeting room reservation is not received, the electronic whiteboard 200A displays, on the display 220, a screen for handwriting input (whiteboard) (S2011), and the process ends.

In S2006, when the meeting room in which the own device (electronic whiteboard 200A) is installed is not available, the reservation management unit 39 of the electronic whiteboard 200 accesses the meeting room reservation management server 400 to determine whether there is an available meeting room close to the current meeting room in which the own device (electronic whiteboard 200A) is installed, after the end time or not (Step S2012). In the present embodiment, the meeting room close to the current meeting room, in which the own device is installed, may be set to any meeting room located on the same floor as the current meeting room, in which the own device is installed. In the present embodiment, conditions to be a meeting room that is close to the current meeting room in which the own device is installed may be set by the reservation management unit 39 in advance.

In S2012, when there is an available meeting room close to the current meeting room, the process performed by the electronic whiteboard 200A proceeds to S2007. In S2012, when there is no available meeting room close to the current meeting room, the electronic whiteboard 200A displays, on the display 220, a screen notifying that no meeting room is available after the end time (Step S2013), and the process ends.

Figure 21:
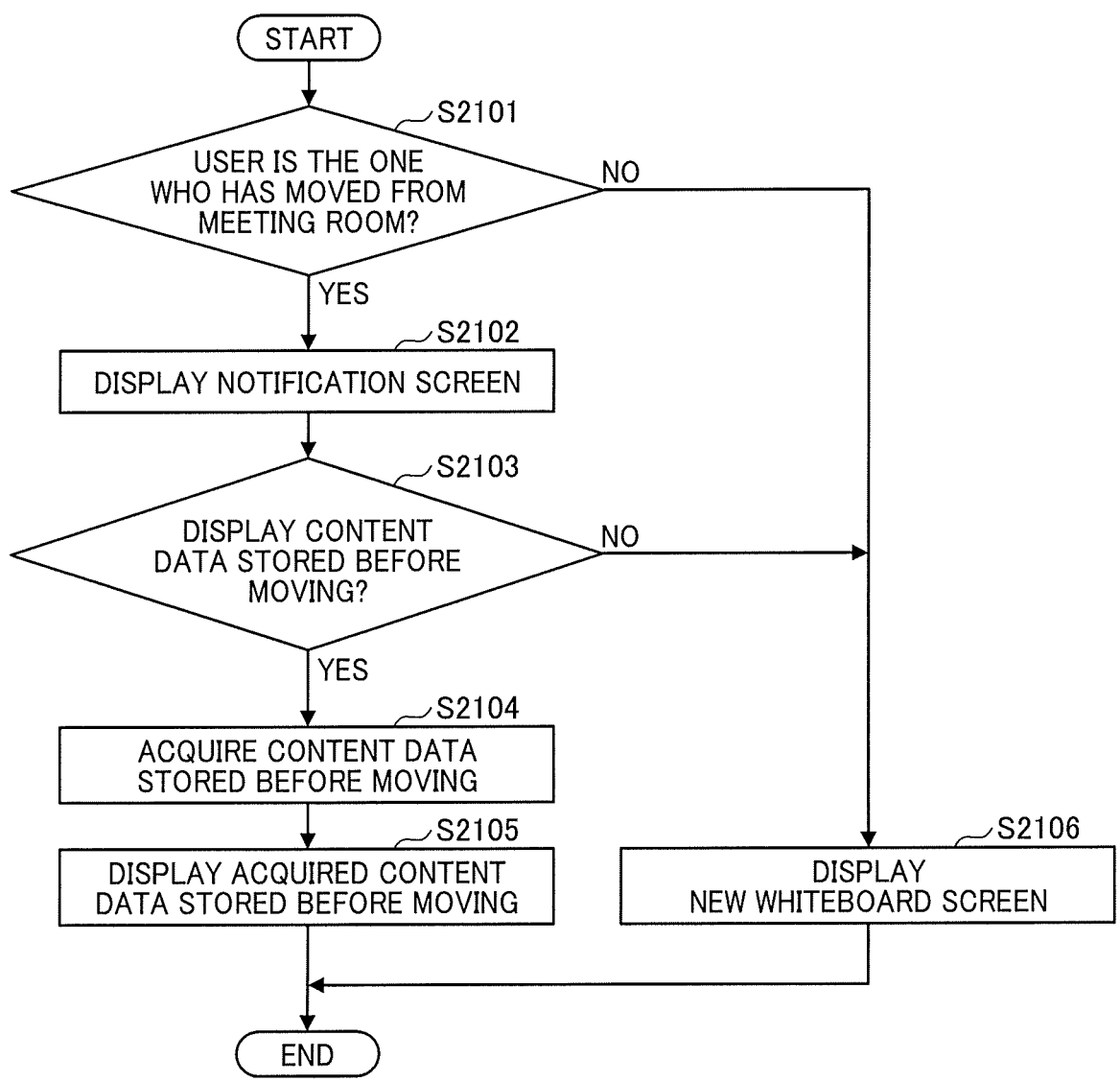
FIG. 21 is a flowchart illustrating another example of a process performed by the electronic whiteboard according to the second embodiment of the present disclosure.

A description is now given of a process of causing the electronic whiteboard 200A-2 to display content data stored in the material management server 600, with reference FIG. 21. FIG. 21 is a flowchart illustrating an example of the process performed by the electronic whiteboard 200A-2 according to the second embodiment of the present disclosure. The process of FIG. 21 corresponds to the processing of S1930 to S1944 illustrated in FIG. 19C.

The acquiring and providing unit 28 of the electronic whiteboard 200A-2 according to the present embodiment determines whether a card ID acquired from an IC card is identical to the card ID of the user who has moved from the meeting room in which the electronic whiteboard 200A-1 is installed (Step S2101). More specifically, the electronic whiteboard 200A-2 transmits the card ID to the terminal management server 500 and acquires an authentication result and a user ID. Subsequently, the electronic whiteboard 200A-2 transmits a time at which the card ID is acquired and the user ID to the material management server 600 as a search request. In the electronic whiteboard 200A-2, the name of the meeting room in which the own device (electronic whiteboard 200A-2) is installed is registered. The electronic whiteboard 200A-2 may transmits to the material management server 600 the name of the meeting room along with the search request.

The material management server 600 searches the content management database 350A for a content management information record that includes all of a user ID that is identical to the user ID received, a meeting room name that is identical to the meeting room name of the meeting room in which the electronic whiteboard 200A-2 is installed, and a period of time, which is indicated as a reservation time, within which the time at which the card ID is acquired is included. The material management server 600 transmits, to the electronic whiteboard 200A-2, information indicating whether there is a corresponding content management information record or not, as a search result (determination result).

That is, the electronic whiteboard 200A-2 determines, in S2101, whether the search result (determination result) transmitted from the material management server 600 is a notification indicating that there is a corresponding content management information record or not.

In S2101, when the user is the one who has moved from the meeting room, namely, when the received notification indicates that there is a corresponding content management information record in the material management server 600, the display 220 of the electronic whiteboard 200A-2 displays a notification screen for notifying the user of the presence of content data to be displayed (Step S2102).

In S2101, the user is not the one who has moved from the meeting room, namely, when the received notification indicates that there is not a corresponding content management information record in the material management server 600, the process performed by the electronic whiteboard 200A-2 proceeds to S2106.

Subsequent to S2102, the electronic whiteboard 200A-2 determines whether an operation of instructing to display the content data to be displayed is received on the notification screen or not (Step S2103). In S2103, when the operation of instructing to display the content data to be displayed is not received, the process performed by the electronic whiteboard 200A-2 proceeds to S2106, which is described later.

In S2103, when the operation of instructing to display the content data to be displayed is received, the electronic whiteboard 200A-2 acquires the content data that is stored before the user has moved from the meeting room, in the material management server 600 (Step S2104). In other words, the electronic whiteboard 200A-2 acquires the content data included in the corresponding content management information record from the material management server 600.

Subsequently, the display 220 of the electronic whiteboard 200A-2 displays the acquired content data (Step S2105), and the process ends.

At this time, the display control unit 24 of the electronic whiteboard 200A-2 may causes the display 220 to display the last page of the acquired content data. Displaying, on the display 220, the last page of the content data allows the user to resume the meeting in a situation that is similar to or substantially the same as the situation before moving. That is, the display of the electronic whiteboard 200A-1 at the time immediately before the user moved is displayed on the electronic whiteboard 200A-2. As described above, according to the present embodiment, the content data previously displayed can be displayed on the electronic whiteboard 200A-2.

In addition, in S2101, in a case where the user is not the same one who has moved from the meeting room, and in a case where the electronic whiteboard 200A-2 does not receive the operation of instructing to display the content data on the notification screen, the display 220 of the electronic whiteboard 200A-2 displays a screen for handwriting input (whiteboard), and the process ends (Step S2106).

Figure 22A:
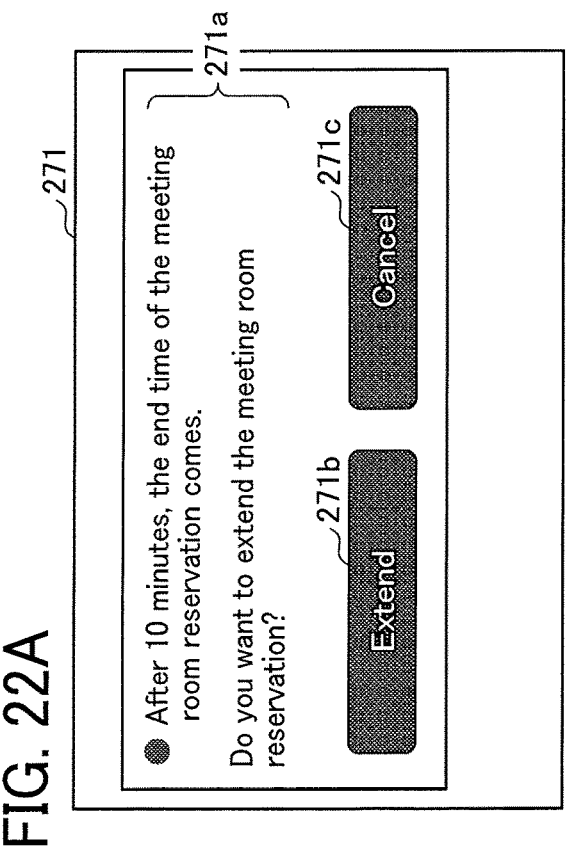
FIG. 22A to FIG. 22D are illustrations of examples of display of the electronic whiteboard according to the second embodiment of the present disclosure.
Figure 22B:
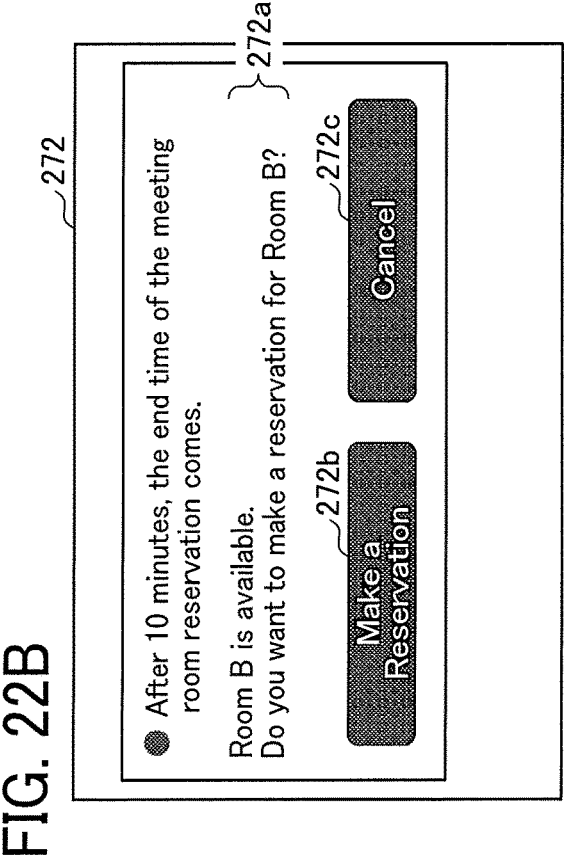
Figure 22C:
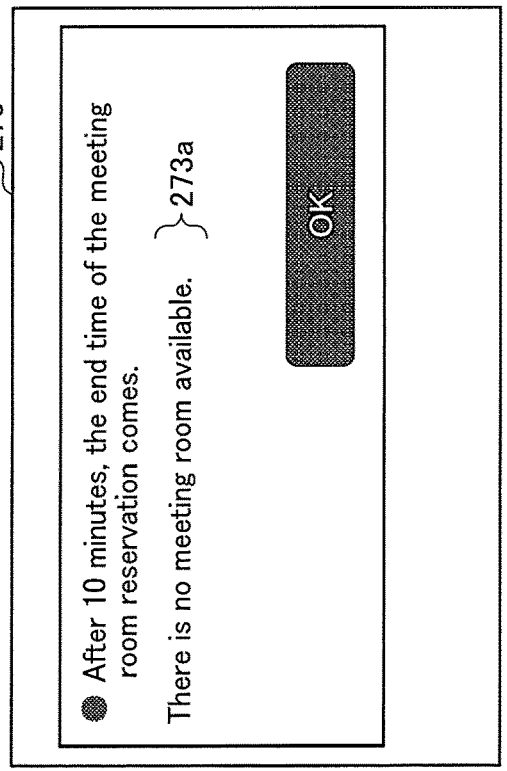
Figure 22D:
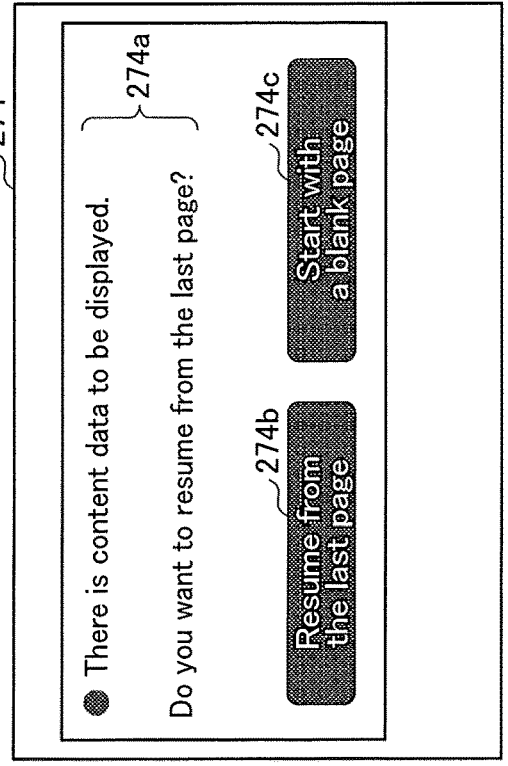

A description is now given of an example of display of the electronic whiteboard 200 according to the present embodiment, with reference to FIG. 22A to FIG. 22D. FIG. 22A to FIG. 22D are illustrations of examples of display of the electronic whiteboard according to the second embodiment of the present disclosure. FIG. 22A is an illustration of an example of an extension confirmation screen 271, according to the present embodiment. FIG. 22B is an illustration of an example of a reservation screen 272, according to the present embodiment. FIG. 22C is an illustration of an example of a screen 273 for notifying that there is no available meeting room, according to the present embodiment. FIG. 22D is an illustration of an example of a screen 274 for notifying that there is content data to be displayed, according to the present embodiment.

The extension confirmation screen 271 illustrated in FIG. 22A is displayed on the display 220 in S1817 illustrated in FIG. 18B, S1917 illustrated in FIG. 19B, and S2002 illustrated in FIG. 20.

The extension confirmation screen 271 displays a notification message 271a, a first operation button 271b, and a second operation button 271c. The notification message 271a includes a message indicating that the end time of the meeting room reservation will come after ten minutes and a message inquiring whether to extend the meeting room reservation or not.

When the first operation button 271b is operated on the extension confirmation screen 271 and there is a meeting room available for a reservation, the screen of the display 220 transitions from the extension confirmation screen 271 to the reservation screen 272 illustrated in FIG. 22B.

The reservation screen 272 displays a notification message 272a including a message indicating there is one or more meeting rooms available and a message inquiring whether to make a meeting room reservation or not. The reservation screen 272 also displays a first operation button 272b and a second operation button 272c.

When the first operation button 271b is operated on the extension confirmation screen 271 and there is no meeting room available for a reservation, the screen of the display 220 transitions to the screen 273 illustrated in FIG. 22C.

The screen 273 displays a notification message 273a indicating that there is no meeting room available for a reservation.

When the first operation button 272b is operated on the reservation screen 272, the screen of the display 220 transitions from the reservation screen 272 to the screen 274 illustrated in FIG. 22D. The screen 274 displays a notification message 274a, a first operation button 274b, and a second operation button 274c.

The notification message 274a includes a message indicating that there is content data to be displayed and a message inquiring whether to display the last page of the content data or not.

When the first operation button 274b is operated on the screen 274, the last page of the content data to be displayed is displayed on the display 220. In addition, when the second operation button 274c is operated, a screen for handwriting input (whiteboard) is displayed on the display 220.

As described above, according to the present embodiment, when a meeting is conducted in the meeting room in which the electronic whiteboard 200A is installed, the user can make an inquiry related to a status of the meeting room reservation for after the end time and make a meeting room reservation by using the electronic whiteboard 200A.

In addition, according to the present embodiment, when the user moves from a first meeting room to a second meeting room to continue a meeting, the electronic whiteboard 200A installed in the second meeting room can acquire the content data previously displayed on the electronic whiteboard 200A that is installed on the first meeting room. Furthermore, according to the present embodiment, the electronic whiteboard 200A displays the content data from the last page after acquiring the content data that is stored in the material management server 600 from the electronic whiteboard 200A installed in the first meeting room, from which the user has moved, before the user moved from the first meeting room. As described above, according to the present embodiment, a situation similar to or substantially the same as the situation before the user moved from the first meeting room can be achieved in the second meeting room, which is the destination of moving.

In addition, in the above description of the embodiment, the meeting is conducted in the meeting room in which the electronic whiteboard 200A is installed, however, the embodiments are not intended to be limited to this. For example, the embodiments can also be applied to a class room in which the electronic whiteboard 200A is installed in an educational institution.

Third Embodiment

A description is now given of a third embodiment of the present disclosure, with reference to drawings. The third embodiment is different form the first embodiment in that an image projection apparatus 700 is used instead of the electronic whiteboard 200 in an electronic whiteboard system 100B. In the following description of the third embodiment, the difference from the first embodiment is focused. In the following description, the same reference numerals are given to the same or corresponding functions or configurations as those of the first embodiment, and redundant descriptions thereof are omitted or simplified appropriately.

Figure 23:
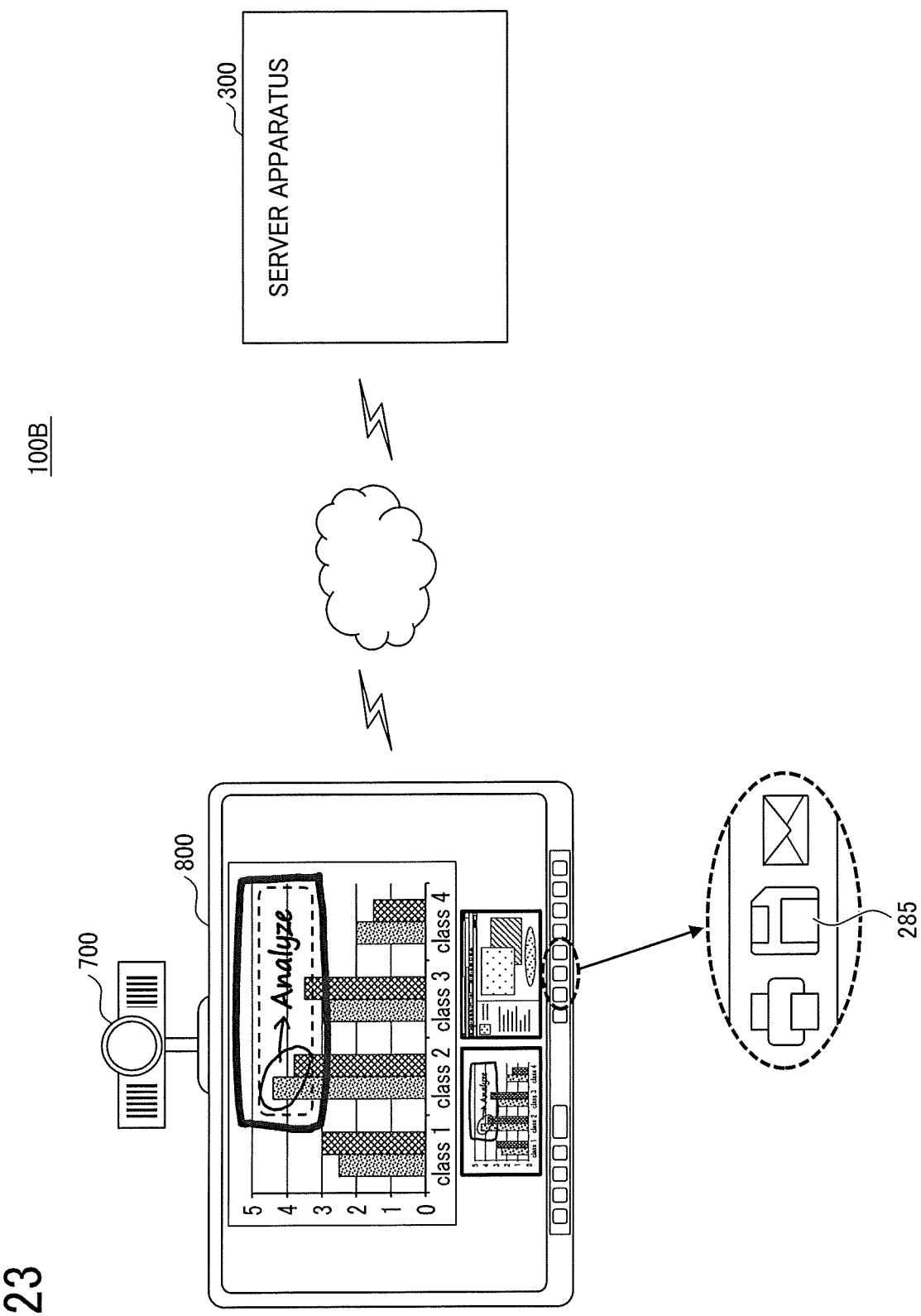
FIG. 23 is an illustration of an overview of an electronic whiteboard system according to a third embodiment of the present disclosure.

FIG. 23 is an illustration of an overview of the electronic whiteboard system 100B according to the third embodiment of the present disclosure. The electronic whiteboard system 100B illustrated in FIG. 23 includes the image projection apparatus (projector) 700 and the server apparatus 300.

The image projection apparatus 700 projects image data input from, for example, a terminal apparatus connected to the image projection apparatus 700 onto a screen 800. The screen 800 corresponds to the display 220. For example, a whiteboard, a wall surface, or the like can substitute as the screen 800.

In addition, the image projection apparatus 700 detects a motion of the electronic pen, user's hand, etc., to detect a handwriting input to the screen 800, and thereby projecting a stroke image onto the screen 800.

In addition, when a save button 285 displayed on the screen 800 is operated, the image projection apparatus 700 transmits, to the server apparatus 300, image data of the image projected on the screen 800 as content data, for example.

In the above example, the image projection apparatus 700 according to the present embodiment is provided with a reader to read identification information from a privately-owned terminal, or connected to a reader. The image projection apparatus 700 transmits the identification information read from the privately-owned terminal to the server apparatus 300 and receives a user ID as an authentication result. Then, the image projection apparatus 700 transmits, to the server apparatus 300, the acquired user ID and information on a time at which the identification information is acquired, in association with the content data.

In addition, when the save button 285 is operated, the image projection apparatus 700 may output, to a portable recording medium such as a USB memory, the user ID and the time at which the identification information is acquired to be stored in association with the content data, for example.

Figure 24:
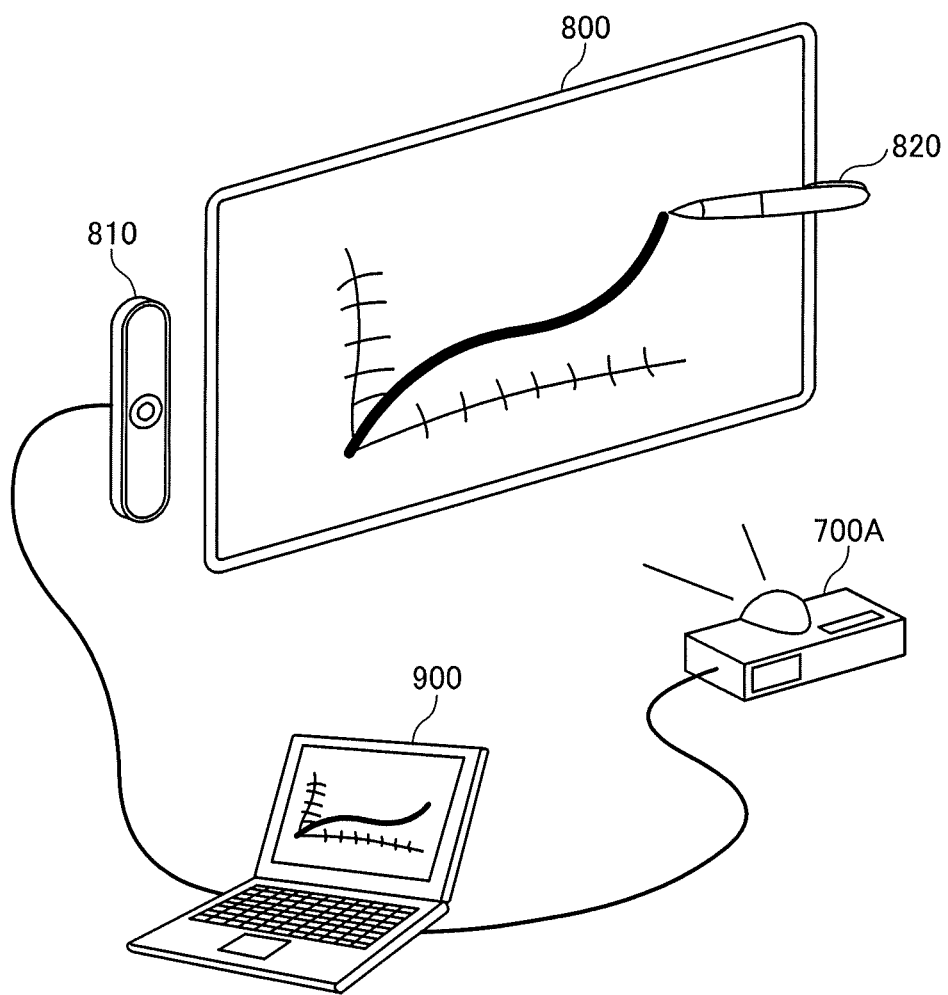
FIG. 24 is a diagram illustrating a first modification of the electronic whiteboard system according to one of the embodiments of the present disclosure.
Figure 25:
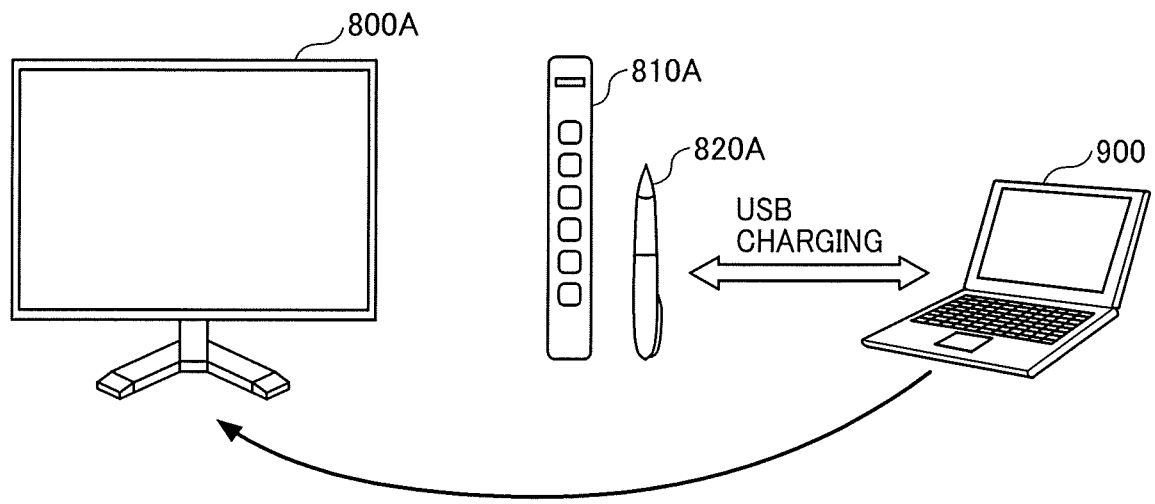
FIG. 25 is a diagram illustrating a second modification of the electronic whiteboard system according to one of the embodiments of the present disclosure.
Figure 26:
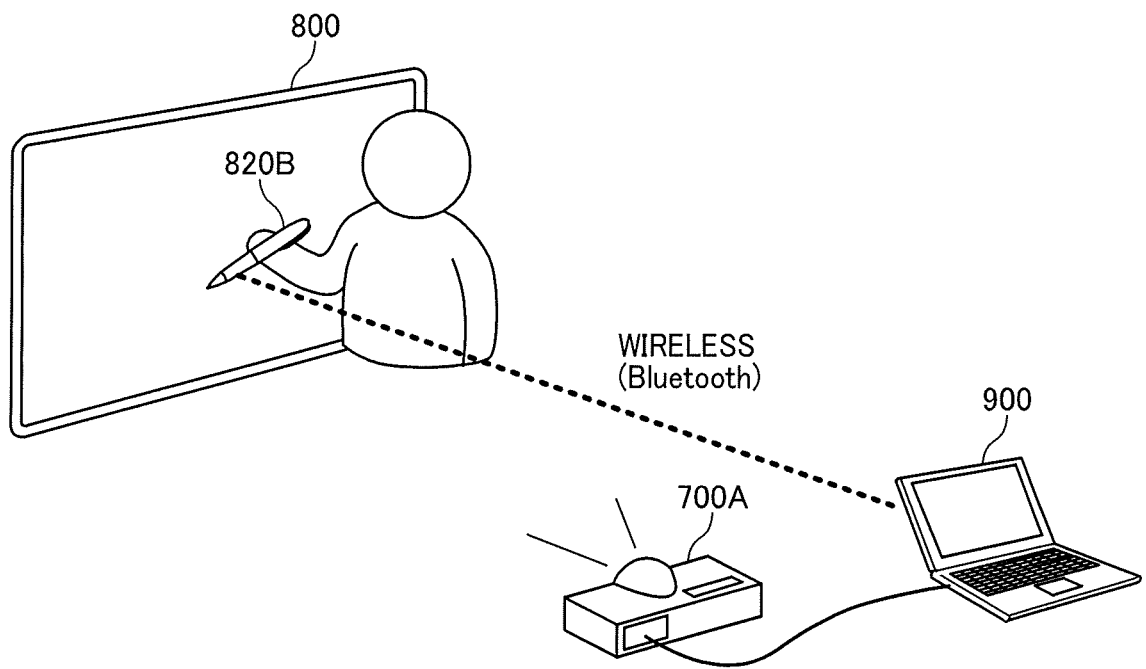
FIG. 26 is a diagram illustrating a third modification of the electronic whiteboard system according to one of the embodiments of the present disclosure.

A description is now given of several modifications of the electronic whiteboard system of each of the above-described embodiments, with reference to FIG. 24 to FIG. 26.

FIG. 24 is a diagram illustrating a first modification of the electronic whiteboard system according to each of the above-described embodiments. In the example of FIG. 24, an electronic whiteboard system according to the first modification includes, instead of the electronic whiteboard 200, a terminal apparatus 900, an image projection apparatus 700A, and a pen motion detection device 810.

The terminal apparatus 900 is coupled to the image projection apparatus 700A and the pen motion detection device 810 by wire.

The image projection apparatus 700A projects image data input from the terminal apparatus 900 onto the screen 800.

The pen motion detection device 810 communicates with an electronic pen 820 to detect a motion of the electronic pen 820 in the vicinity of the screen 800. More specifically, the pen motion detection device 810 detects coordinate information indicating a position pointed by the electronic pen 820 on the screen 800 and transmits the coordinate information to the terminal apparatus 900.

Based on the coordinate information received from the pen motion detection device 810, the terminal apparatus 900 generates stroke image data of a stroke image input by the electronic pen 820 and causes the image projection apparatus 700A to project the stroke image on the screen 800.

In the above example, the terminal apparatus 900 according to the present embodiment is provided with a reader to read identification information from a privately-owned terminal, or connected to a reader. The terminal apparatus 900 transmits the identification information read from the privately-owned terminal to the server apparatus 300 and receives a user ID as an authentication result. Then, the terminal apparatus 900 transmits, to the server apparatus 300, an acquired user ID and information on a time at which the identification information is acquired in association with the content data.

In addition, the terminal apparatus 900 generates content data (a plurality of content data items) including superimposed image data indicating the image projected by the image projection apparatus 700A. Then, the terminal apparatus 900 selects a content data item that includes stroke information from the content data and transmits the selected content data item to the server apparatus 300.

FIG. 25 is a diagram illustrating a second modification of the electronic whiteboard system according to each of the above-described embodiments. In the example of FIG. 25, an information processing system according to the second modification includes, instead of the electronic whiteboard 200, the terminal apparatus 900, a display 800A, and a pen motion detection device 810A.

The pen motion detection device 810A, which is disposed in the vicinity of the display 800A, detects coordinate information indicating a position pointed by an electronic pen 820A on the display 800A and transmits the coordinate information to the terminal apparatus 900. In the example of FIG. 25, the electronic pen 820A can be charged from the terminal apparatus 900 via a USB connector.

Based on the coordinate information received from the pen motion detection device 810A, the terminal apparatus 900 generates image data of stroke image input by the electronic pen 820A and displays an image based on the image data of stroke image on the display 800A.

In addition, the terminal apparatus 900 according to the present embodiment generates content data (a plurality of content data items) including superimposed image data indicating the image projected by the image projection apparatus 700A. Then, the terminal apparatus 900 selects a content data item that includes stroke information from the content data and transmits the selected content data item to the server apparatus 300.

FIG. 26 is a diagram illustrating a third modification of the electronic whiteboard system according to each of the above-described embodiments. In the example of FIG. 26, an information processing system according to the third modification includes, instead of the electronic whiteboard 200, the terminal apparatus 900 and the image projection apparatus 700A.

The terminal apparatus 900 communicates with an electronic pen 820B through a wireless network such as Bluetooth, to receive coordinate information of a position pointed by the electronic pen 820B on the screen 800. Based on the received coordinate information, the terminal apparatus 900 generates image data of a stroke image input by the electronic pen 820B and causes the image projection apparatus 700A to project the stroke image on the screen 800.

In addition, the terminal apparatus 900 generates content data (a plurality of content data items) including superimposed image data indicating the image projected by the image projection apparatus 700A. Then, the terminal apparatus 900 selects a content data item that includes stroke information from the content data and transmits the selected content data item to the server apparatus 300.

As described above, each of the embodiments can be applied to various system configurations.

As described above, according to an embodiment of the present disclosure, it is possible to display desired data on an electronic whiteboard easily.

Any one of the above-described operations may be performed in various other ways, for example, in an order different from the one described above.

Although the present invention has been described based on the respective embodiments, the present invention is not limited to the requirements described in the above embodiments. These are just examples and can be appropriately modified without departing from the spirit of the present disclosure.

Numerous additional modifications and variations are possible in light of the above teachings. It is therefore to be understood that, within the scope of the appended claims, the disclosure of this patent specification may be practiced otherwise than as specifically described herein.

For example, elements and/or features of different illustrative embodiments may be combined with each other and/or substituted for each other within the scope of this disclosure and appended claims.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

What is claimed is:

1. An electronic whiteboard system, comprising:
   at least one information processing system; and
   at least one electronic whiteboard communicably connected to the at least one information processing system,
   the at least one information processing system being configured to store, in a memory, content management information including one or more content management information records in each of which content data, user information, and information on a period of time are associated with each other, the content data being generated based on data displayed on a display of the at least one electronic whiteboard, the user information identifying a user of the at least one electronic whiteboard, and the information on a period of time indicating a period of time to display the content data on the display of the at least one electronic whiteboard, and the at least one electronic whiteboard being configured to
read, from a privately-owned terminal of the user, identification information corresponding to the user information identifying the user,
transmit, to the information processing system, the identification information and information on a time at which the identification information is read,
receive, from the information processing system, content data included in one of the one or more content management information records, the one of the one or more content management information records including a period of time within which the time at which the identification information is read is included and user information corresponding to the identification information, and
display, on the display, the content data.

2. The electronic whiteboard system of claim 1, wherein the at least one electronic whiteboard includes a plurality of electronic whiteboards including a first electronic whiteboard and a second electronic whiteboard, the information processing system stores, in the memory, a content management information record that includes content data generated based on data displayed on a first display that is a display of the first electronic whiteboard, and the second electronic whiteboard
reads, from the privately-owned terminal owned by a user, the identification information corresponding to the user information included in the content management information record,
transmits the read identification information to the information processing system,
receives the content data included in the content management information record in which a period of time within which the time at which the identification information is read is included and the user information corresponding to the identification information is included, and
displays, on a second display that is a display of the second electronic whiteboard, the received content data.

3. The electronic whiteboard system of claim 2, wherein the information processing system further stores, in the memory, user management information in which the identification information of the privately-owned terminal and the user information are associated with each other, and refers to the memory to authenticate the user based on the identification information received from the first electronic whiteboard.

4. The electronic whiteboard system of claim 3, wherein the at least one information processing system includes a plurality of information processing systems including a first information processing system, a second information processing system, and a third information processing system, wherein the first information processing system stores, in a first memory that is a memory of the first information processing system, the content management information, the second information processing system stores, in a second memory that is a memory of the second information processing system, the user management information, the third information processing system stores, in a third memory that is a memory of the third information processing system, meeting room reservation management information, the meeting room reservation management information including one or more reservation management information records for user information of each user, each of the one or more reservation management information records being information on a meeting room reservation related to a meeting room in which one of the plurality of electronic whiteboards is installed and including an end time of the meeting room reservation, wherein the first electronic whiteboard
refers to the meeting room reservation management information, and
when a current time is a predetermined time before an end time of the meeting room reservation of a meeting room in which the first electronic whiteboard is installed, displays, on the first display, an extension confirmation screen for making an inquiry whether to extend the meeting room reservation or not.

5. The electronic whiteboard system of claim 4, wherein the first electronic whiteboard displays, on the first display, a reservation screen for making the meeting room reservation, in response to an operation of instructing to extend a period of time of the meeting room reservation of the meeting room, received on the extension confirmation screen, and transmits, to the first information processing system, the information on the period of time to display the content data, a name of a meeting room in which the second electronic whiteboard is installed, and the content data generated in the first electronic whiteboard, and wherein the first information processing system stores, in the first memory, a content management information record including the content data, the information on the period of time, and the name of the meeting room.

6. The electronic whiteboard system of claim 5, wherein the second electronic whiteboard receives, from the first information processing system, a notification indicating that there is a content management information record that includes a period of time within which the time at which the identification information is read by the second electronic whiteboard is included and user information identical with the user information corresponding to the identification information, transmits, to the first information processing system, a request for the content data included in the content management information record, and displays, on the second display, the content data received from the first information processing system.

7. The electronic whiteboard system of claim 6, wherein the first electronic whiteboard transmits, to the third information processing system, the information on the period of time to display the content data, the name of the meeting room in which the second electronic whiteboard is installed, and the content data generated in the first electronic whiteboard, the period of time to display the content data being input on the reservation screen, and wherein the third information processing system stores, in the third memory, a reservation management information record including the information on the period of time, the name of the meeting room, and the content data, which are received from the first electronic whiteboard.

8. The electronic whiteboard system of claim 1, wherein, the identification information is a card identifier stored in an integrated circuit chip.

9. An electronic whiteboard communicably connected to an information processing system, the electronic whiteboard comprising circuitry configured to:

reading, from a privately-owned terminal, identification information corresponding to user information identifying a user of the electronic whiteboard, the privately-owned terminal being owned by the user of the electronic whiteboard;

transmit, to the information processing system, the identification information and information on a time at which the identification information is read;

receive content data included in one of one or more content management information records of content management information, each of the one or more of the content management information records includes content data generated based on data displayed, on a display of the electronic whiteboard, user information to identify the user of the electronic whiteboard, and a period of time to display the content data, which are associated with each other, the one of the one or more content management information records including a period of time within which the time at which the identification information is read is included and including a user information identical to the user information corresponding to the identification information; and display, on the display, the content data.

10. A method of displaying content data, the method comprising:

reading, from a privately-owned terminal, identification information corresponding to user information identifying a user of an electronic whiteboard, the privately-owned terminal being owned by the user of the electronic whiteboard;

transmitting, to an information processing system, the identification information and information on a time at which the identification information is read, the information processing system storing content management information including one or more content management information records in each of which content data, the user information, and information on a period of time are associated with each other, the content data being generated based on data displayed on a display of the electronic whiteboard, the user information identifying a user of the electronic whiteboard, and the information on a period of time indicating a period of time to display the content data on the display of the electronic whiteboard;

receiving, from the information processing system, content data included in a content management information record that includes a period of time within which the time at which the identification information is read is included and user information identical with the user information corresponding to the identification information; and displaying, with the display, the content data.

* * * * *